US007237264B1

(12) United States Patent
Graham et al.

(10) Patent No.: US 7,237,264 B1
(45) Date of Patent: Jun. 26, 2007

(54) SYSTEM AND METHOD FOR PREVENTING NETWORK MISUSE

(75) Inventors: Robert David Graham, Menlo Park, CA (US); Peter Kavaler, Castro Valley, CA (US)

(73) Assignee: Internet Security Systems, Inc., Atlanta, GA (US)

( * ) Notice: Subject to any disclaimer, the term of this patent is extended or adjusted under 35 U.S.C. 154(b) by 674 days.

(21) Appl. No.: 09/874,574

(22) Filed: Jun. 4, 2001

(51) Int. Cl.
*H04L 29/00* (2006.01)

(52) U.S. Cl. .......................................... 726/23; 726/25

(58) Field of Classification Search ................ 709/225, 709/223; 713/201, 200; 726/25, 23
See application file for complete search history.

(56) References Cited

U.S. PATENT DOCUMENTS

| | | | |
|---|---|---|---|
| 4,223,380 | A | 9/1980 | Antonaccio et al. |
| 4,400,769 | A | 8/1983 | Kaneda et al. |
| 4,672,609 | A | 6/1987 | Humphrey et al. |
| 4,773,028 | A | 9/1988 | Tallman |
| 4,819,234 | A | 4/1989 | Huber |
| 4,975,950 | A | 12/1990 | Lentz |
| 5,032,979 | A | 7/1991 | Hecht et al. |
| 5,121,345 | A | 6/1992 | Lentz |
| 5,204,966 | A | 4/1993 | Wittenberg et al. |
| 5,210,704 | A | 5/1993 | Husseiny |
| 5,274,824 | A | 12/1993 | Howarth |
| 5,278,901 | A | 1/1994 | Shieh et al. |
| 5,309,562 | A | 5/1994 | Li |
| 5,311,593 | A | 5/1994 | Carmi |
| 5,345,595 | A | 9/1994 | Johnson et al. |
| 5,347,450 | A | 9/1994 | Nugent |
| 5,353,393 | A | 10/1994 | Bennett et al. |
| 5,359,659 | A | 10/1994 | Rosenthal |
| 5,371,852 | A | 12/1994 | Attanasio et al. |
| 5,398,196 | A | 3/1995 | Chambers |
| 5,414,833 | A | 5/1995 | Hershey et al. |
| 5,440,723 | A | 8/1995 | Arnold et al. |
| 5,452,442 | A | 9/1995 | Kephart |
| 5,454,074 | A | 9/1995 | Hartel et al. |
| 5,475,839 | A | 12/1995 | Watson et al. |
| 5,511,184 | A | 4/1996 | Lin |
| 5,515,508 | A | 5/1996 | Pettus et al. |

(Continued)

FOREIGN PATENT DOCUMENTS

| | | |
|---|---|---|
| EP | 0 636 977 | 5/2001 |
| EP | 0 985 995 | 8/2003 |
| WO | WO 93/25024 | 12/1993 |
| WO | WO 98/41919 | 9/1998 |
| WO | WO 99/00720 | 1/1999 |

(Continued)

OTHER PUBLICATIONS

Detecting Backdoors, Yin Zhang and Vem Paxson, Feb. 19, 1998.*

(Continued)

*Primary Examiner*—Kambiz Zand
*Assistant Examiner*—Andrew L. Nalven
(74) *Attorney, Agent, or Firm*—King & Spalding LLP

(57) ABSTRACT

A system and method for preventing misuse conditions on a data network are described. Embodiments of the system and method evaluate potential network misuse signatures by analyzing variables such as the state of the network and/or target, the context in which the potential misuse signatures are detected, the response/reaction of the target and/or the fingerprint of the target. These and other variables may be factored in to the misuse determination, either alone, or in combination.

52 Claims, 12 Drawing Sheets

U.S. PATENT DOCUMENTS

| | | | |
|---|---|---|---|
| 5,522,026 A | 5/1996 | Records et al. | |
| 5,539,659 A | 7/1996 | McKee et al. | |
| 5,557,742 A | 9/1996 | Smaha et al. | |
| 5,586,260 A | 12/1996 | Hu | |
| 5,590,331 A | 12/1996 | Lewis et al. | |
| 5,606,668 A | 2/1997 | Shwed | |
| 5,623,600 A | 4/1997 | Ji et al. | |
| 5,623,601 A | 4/1997 | Vu | |
| 5,630,061 A | 5/1997 | Richter et al. | |
| 5,649,095 A | 7/1997 | Cozza | |
| 5,649,185 A | 7/1997 | Antognini et al. | |
| 5,675,711 A | 10/1997 | Kephart et al. | |
| 5,696,486 A | 12/1997 | Poliquin et al. | |
| 5,696,822 A | 12/1997 | Nachenberg | |
| 5,706,210 A | 1/1998 | Kumano et al. | |
| 5,715,395 A | 2/1998 | Brabson et al. | |
| 5,734,697 A | 3/1998 | Jabbarnezhad | |
| 5,745,692 A | 4/1998 | Lohmann, II et al. | |
| 5,748,098 A | 5/1998 | Grace | |
| 5,761,504 A | 6/1998 | Corrigan et al. | |
| 5,764,887 A | 6/1998 | Kells et al. | |
| 5,764,890 A | 6/1998 | Glasser et al. | |
| 5,765,030 A | 6/1998 | Nachenberg et al. | |
| 5,774,727 A | 6/1998 | Walsh et al. | |
| 5,787,177 A | 7/1998 | Leppek | |
| 5,790,799 A | 8/1998 | Mogul | |
| 5,796,942 A | 8/1998 | Esbensen | |
| 5,798,706 A | 8/1998 | Kraemer et al. | |
| 5,812,763 A | 9/1998 | Teng | |
| 5,815,574 A | 9/1998 | Fortinsky | |
| 5,822,517 A | 10/1998 | Dotan | |
| 5,826,013 A | 10/1998 | Nachenberg | |
| 5,828,833 A | 10/1998 | Belville et al. | |
| 5,832,208 A | 11/1998 | Chen et al. | |
| 5,832,211 A | 11/1998 | Blakley, III et al. | |
| 5,835,726 A | 11/1998 | Shwed et al. | |
| 5,838,903 A | 11/1998 | Blakely, III et al. | |
| 5,842,002 A | 11/1998 | Schnurer et al. | |
| 5,845,067 A | 12/1998 | Porter et al. | |
| 5,848,233 A | 12/1998 | Radia et al. | |
| 5,854,916 A | 12/1998 | Nachenberg | |
| 5,857,191 A | 1/1999 | Blackwell, Jr. et al. | |
| 5,864,665 A | 1/1999 | Tran | |
| 5,864,803 A | 1/1999 | Nussbaum | |
| 5,872,915 A | 2/1999 | Dykes et al. | |
| 5,872,978 A | 2/1999 | Hoskins | |
| 5,875,296 A | 2/1999 | Shi et al. | |
| 5,878,420 A | 3/1999 | de la Salle | |
| 5,881,236 A | 3/1999 | Dickey | |
| 5,884,033 A | 3/1999 | Duvall et al. | |
| 5,892,903 A | 4/1999 | Klaus | |
| 5,899,999 A | 5/1999 | De Bonet | |
| 5,905,859 A | 5/1999 | Holloway et al. | |
| 5,907,834 A | 5/1999 | Kephart et al. | |
| 5,919,257 A | 7/1999 | Trostle | |
| 5,919,258 A | 7/1999 | Kayashima et al. | |
| 5,922,051 A | 7/1999 | Sidey | |
| 5,925,126 A | 7/1999 | Hsieh | |
| 5,931,946 A | 8/1999 | Terada et al. | |
| 5,940,591 A | 8/1999 | Boyle et al. | |
| 5,950,012 A | 9/1999 | Shiell et al. | |
| 5,961,644 A | 10/1999 | Kurtzberg et al. | |
| 5,964,839 A | 10/1999 | Johnson et al. | |
| 5,964,889 A | 10/1999 | Nachenberg | |
| 5,974,237 A | 10/1999 | Shurmer et al. | |
| 5,974,457 A | 10/1999 | Waclawsky et al. | |
| 5,978,917 A | 11/1999 | Chi | |
| 5,983,270 A | 11/1999 | Abraham et al. | |
| 5,983,348 A | 11/1999 | Ji | |
| 5,983,350 A | 11/1999 | Minear et al. | |
| 5,987,606 A | 11/1999 | Cirasole et al. | |
| 5,987,610 A | 11/1999 | Franczek et al. | |
| 5,987,611 A | 11/1999 | Freund | |
| 5,991,856 A | 11/1999 | Spilo et al. | |
| 5,991,881 A * | 11/1999 | Conklin et al. | 713/201 |
| 5,999,711 A | 12/1999 | Misra et al. | |
| 5,999,723 A | 12/1999 | Nachenberg | |
| 6,003,132 A | 12/1999 | Mann | |
| 6,006,016 A | 12/1999 | Faigon et al. | |
| 6,009,467 A | 12/1999 | Ratcliff et al. | |
| 6,014,645 A | 1/2000 | Cunningham | |
| 6,016,553 A | 1/2000 | Schneider et al. | |
| 6,021,510 A | 2/2000 | Nachenberg | |
| 6,026,442 A | 2/2000 | Lewis et al. | |
| 6,029,256 A | 2/2000 | Kouznetsov | |
| 6,035,323 A | 3/2000 | Narayen et al. | |
| 6,035,423 A | 3/2000 | Hodges et al. | |
| 6,041,347 A | 3/2000 | Harsham et al. | |
| 6,052,709 A | 4/2000 | Paul | |
| 6,061,795 A | 5/2000 | Dircks et al. | |
| 6,067,410 A | 5/2000 | Nachenberg | |
| 6,070,190 A | 5/2000 | Reps et al. | |
| 6,070,244 A | 5/2000 | Orchier et al. | |
| 6,073,172 A | 6/2000 | Frailong et al. | |
| 6,081,894 A | 6/2000 | Mann | |
| 6,085,224 A | 7/2000 | Wagner | |
| 6,088,803 A | 7/2000 | Tso et al. | |
| 6,088,804 A | 7/2000 | Hill et al. | |
| 6,092,194 A | 7/2000 | Touboul | |
| 6,094,731 A | 7/2000 | Waldin et al. | |
| 6,098,173 A | 8/2000 | Elgressy et al. | |
| 6,104,783 A | 8/2000 | DeFino | |
| 6,108,799 A | 8/2000 | Boulay et al. | |
| 6,118,940 A | 9/2000 | Alexander, III et al. | |
| 6,119,165 A | 9/2000 | Li et al. | |
| 6,119,234 A | 9/2000 | Aziz et al. | |
| 6,122,738 A | 9/2000 | Millard | |
| 6,144,961 A | 11/2000 | de la Salle | |
| 6,154,844 A | 11/2000 | Touboul et al. | |
| 6,161,109 A | 12/2000 | Matamoros et al. | |
| 6,167,520 A | 12/2000 | Touboul | |
| 6,173,413 B1 | 1/2001 | Slaughter et al. | |
| 6,185,689 B1 | 2/2001 | Todd, Sr. et al. | |
| 6,195,687 B1 | 2/2001 | Greaves et al. | |
| 6,199,181 B1 | 3/2001 | Rechef et al. | |
| 6,205,552 B1 | 3/2001 | Fudge | |
| 6,220,768 B1 | 4/2001 | Barroux | |
| 6,226,372 B1 | 5/2001 | Beebe et al. | |
| 6,230,288 B1 | 5/2001 | Kuo et al. | |
| 6,266,773 B1 | 7/2001 | Kisor et al. | |
| 6,266,774 B1 | 7/2001 | Sampath et al. | |
| 6,271,840 B1 | 8/2001 | Finseth et al. | |
| 6,272,641 B1 | 8/2001 | Ji | |
| 6,275,938 B1 | 8/2001 | Bond et al. | |
| 6,275,942 B1 * | 8/2001 | Bernhard et al. | 713/201 |
| 6,278,886 B1 | 8/2001 | Hwang | |
| 6,279,113 B1 * | 8/2001 | Vaidya | 726/23 |
| 6,282,546 B1 | 8/2001 | Gleichauf et al. | |
| 6,298,445 B1 | 10/2001 | Shostack et al. | |
| 6,301,668 B1 * | 10/2001 | Gleichauf et al. | 713/201 |
| 6,314,520 B1 | 11/2001 | Schell et al. | |
| 6,314,525 B1 | 11/2001 | Mahalingham et al. | |
| 6,321,338 B1 | 11/2001 | Porras et al. | |
| 6,324,627 B1 | 11/2001 | Kricheff et al. | |
| 6,324,647 B1 | 11/2001 | Bowman-Amuah | |
| 6,324,656 B1 | 11/2001 | Gleichauf et al. | |
| 6,338,141 B1 | 1/2002 | Wells | |
| 6,347,374 B1 | 2/2002 | Drake et al. | |
| 6,353,385 B1 | 3/2002 | Molini et al. | |
| 6,357,008 B1 | 3/2002 | Nachenberg | |
| 6,377,994 B1 | 4/2002 | Ault et al. | |
| 6,396,845 B1 | 5/2002 | Sugita | |
| 6,397,242 B1 | 5/2002 | Devine et al. | |
| 6,397,245 B1 | 5/2002 | Johnson, II et al. | |

| | | | | |
|---|---|---|---|---|
| 6,405,318 | B1 | 6/2002 | Rowland | |
| 6,405,364 | B1 | 6/2002 | Bowman-Amuah | |
| 6,408,391 | B1 | 6/2002 | Huff et al. | |
| 6,415,321 | B1 | 7/2002 | Gleichauf et al. | |
| 6,429,952 | B1 | 8/2002 | Olbricht | |
| 6,434,615 | B1 | 8/2002 | Dinh et al. | |
| 6,438,600 | B1 | 8/2002 | Greenfield et al. | |
| 6,445,822 | B1 | 9/2002 | Crill et al. | |
| 6,453,345 | B2 | 9/2002 | Trcka et al. | |
| 6,453,346 | B1 | 9/2002 | Garg et al. | |
| 6,460,141 | B1 * | 10/2002 | Olden | 726/4 |
| 6,463,426 | B1 | 10/2002 | Lipson et al. | |
| 6,467,002 | B1 | 10/2002 | Yang | |
| 6,470,449 | B1 | 10/2002 | Blandford | |
| 6,477,585 | B1 | 11/2002 | Cohen et al. | |
| 6,477,648 | B1 | 11/2002 | Schell et al. | |
| 6,477,651 | B1 | 11/2002 | Teal | |
| 6,484,203 | B1 | 11/2002 | Porras et al. | |
| 6,487,666 | B1 | 11/2002 | Shanklin et al. | |
| 6,493,752 | B1 | 12/2002 | Lee et al. | |
| 6,496,858 | B1 | 12/2002 | Frailong et al. | |
| 6,499,107 | B1 | 12/2002 | Gleichauf et al. | |
| 6,510,523 | B1 | 1/2003 | Perlman et al. | |
| 6,517,587 | B2 | 2/2003 | Satyavolu et al. | |
| 6,519,647 | B1 | 2/2003 | Howard et al. | |
| 6,519,703 | B1 | 2/2003 | Joyce | |
| 6,530,024 | B1 | 3/2003 | Proctor | |
| 6,535,227 | B1 | 3/2003 | Fox et al. | |
| 6,546,493 | B1 | 4/2003 | Magdych et al. | |
| 6,563,959 | B1 | 5/2003 | Troyanker | |
| 6,574,737 | B1 | 6/2003 | Kingsford et al. | |
| 6,578,147 | B1 | 6/2003 | Shanklin et al. | |
| 6,584,454 | B1 | 6/2003 | Hummel, Jr. et al. | |
| 6,601,190 | B1 | 7/2003 | Meyer et al. | |
| 6,606,744 | B1 | 8/2003 | Mikurak | |
| 6,618,501 | B1 | 9/2003 | Osawa et al. | |
| 6,628,824 | B1 | 9/2003 | Belanger | |
| 6,647,139 | B1 | 11/2003 | Kunii et al. | |
| 6,647,400 | B1 | 11/2003 | Moran | |
| 6,661,904 | B1 | 12/2003 | Sasich et al. | |
| 6,668,082 | B1 | 12/2003 | Davison et al. | |
| 6,668,084 | B1 | 12/2003 | Minami | |
| 6,681,331 | B1 | 1/2004 | Munson et al. | |
| 6,691,232 | B1 | 2/2004 | Wood et al. | |
| 6,704,874 | B1 | 3/2004 | Porras et al. | |
| 6,708,212 | B2 | 3/2004 | Porras et al. | |
| 6,711,127 | B1 | 3/2004 | Gorman et al. | |
| 6,711,615 | B2 | 3/2004 | Porras et al. | |
| 6,718,383 | B1 | 4/2004 | Hebert | |
| 6,721,806 | B2 | 4/2004 | Boyd et al. | |
| 6,725,377 | B1 | 4/2004 | Kouznetsov | |
| 6,725,378 | B1 | 4/2004 | Schuba et al. | |
| 6,728,886 | B1 * | 4/2004 | Ji et al. | 713/201 |
| 6,775,780 | B1 | 8/2004 | Muttik | |
| 6,792,144 | B1 | 9/2004 | Yan et al. | |
| 6,792,546 | B1 | 9/2004 | Shanklin et al. | |
| 6,816,973 | B1 | 11/2004 | Gleichauf et al. | |
| 6,839,850 | B1 | 1/2005 | Campbell et al. | |
| 6,851,057 | B1 | 2/2005 | Nachenberg | |
| 6,871,284 | B2 | 3/2005 | Cooper et al. | |
| 6,886,102 | B1 | 4/2005 | Lyle | |
| 6,889,168 | B2 | 5/2005 | Hartley et al. | |
| 6,912,676 | B1 | 6/2005 | Gusler et al. | |
| 2001/0034847 | A1 | 10/2001 | Gaul, Jr. | |
| 2002/0032717 | A1 | 3/2002 | Malan et al. | |
| 2002/0032793 | A1 | 3/2002 | Malan et al. | |
| 2002/0032880 | A1 | 3/2002 | Poletto et al. | |
| 2002/0035698 | A1 | 3/2002 | Malan et al. | |
| 2002/0083331 | A1 * | 6/2002 | Krumel | 713/200 |
| 2002/0083334 | A1 | 6/2002 | Rogers et al. | |
| 2002/0138753 | A1 | 9/2002 | Munson | |
| 2002/0144156 | A1 | 10/2002 | Copeland, III | |
| 2003/0037136 | A1 | 2/2003 | Labovitz et al. | |
| 2003/0088791 | A1 | 5/2003 | Porras et al. | |
| 2003/0212903 | A1 | 11/2003 | Porras et al. | |
| 2004/0010718 | A1 | 1/2004 | Porras et al. | |

FOREIGN PATENT DOCUMENTS

| | | |
|---|---|---|
| WO | WO 99/13427 | 3/1999 |
| WO | WO 99/15966 | 4/1999 |
| WO | WO 99/50734 | 10/1999 |
| WO | WO 99/53391 | 10/1999 |
| WO | WO 99/57626 | 11/1999 |
| WO | WO 00/02115 | 1/2000 |
| WO | WO 00/10278 | 2/2000 |
| WO | WO 00/25214 | 5/2000 |
| WO | WO 00/25527 | 5/2000 |
| WO | WO 00/34867 | 6/2000 |
| WO | WO 00/054458 | 9/2000 |
| WO | WO 00/54458 | 9/2000 |
| WO | WO 01/084285 | 11/2001 |
| WO | WO 01/84285 | 11/2001 |
| WO | WO 02/06928 | 1/2002 |
| WO | WO 02/006928 | 1/2002 |
| WO | WO 02/056152 | 7/2002 |
| WO | WO 02/101516 | 12/2002 |

OTHER PUBLICATIONS

Security Reality Check, Rik Farrow, Jul. 1, 1999, Network Magazine.*

Steve Steinke "Firewalls", http://www.itarchitect.com/shared/article/showArticle.jhtml?articleld=8702843&pgno=1.*

Using the CamNet BBS FAQ, http://www.cam.net.uk/manuals/bbsfaq/bbsfaq.htm, Jan. 17, 1997.

Express Storehouse Ordering System, "Accessing ESOS through the Network", http://www-bfs.ucsd.edu/mss/esos/man3.htm, Sep. 3, 1996.

Nasire, NASIRC Bulletin #94-10, http://cs-www.ncsl.nist.gov/secalert/nasa9410.txt, Mar. 29, 1994.

Packages in the net directory, http://linux4u.jinr.ru/usoft/WWW/www_debian.org/FTP/net.html, Mar. 20, 1997.

Essex, David, E-Sleuths Make Net Safe for E-Commerce, Computerworld, Jun. 2000, pp. 1-2.

Newman, David, Intrusion Detection Systems, Data Communications, 1998, pp. 1-9.

International Search Report for PCT/US02/17161 of Dec. 31, 2002.

Hyland, et al., Concentric Supervision of Security Applications: A New Security Management Paradigm Computer Security Applications Conference, 1998, pp. 59-68.

Koilpillai et al., Recon- A Tool for Incident Detection, Tracking and Response, Darpa Information Survivability Conference and Exposition, 2000, pp. 199-206.

Alves-Foss, J., An Overview of SNIF: A Tool for Surveying Network Information Flow, Network and Distributed System Security, 1995, pp. 94-101.

Mansouri-Samani et al., A Configurable Event Service for Distributed Systems Configurable Distributed Systems, 1996, pp. 210-217.

International Search Report for PCT/US01/13769 of March 8, 2002.

Jagannathan et al., System Design Document: Next-Generation Intrusion Detection Expert Systems (NIDES), Internet Citation, Mar. 9, 1993, XP002136082, pp. 1-66.

Koilpillai, Adaptive Network Security Management, DARPA NGI PI Conference, Oct. 1998, pp. 1-27.

Hiverworld Continuous Adaptive Risk Management, Hiverworld, Inc., 1999-2000, pp. 1-14.

International Search Report for PCT/US02/04989of Sep. 19, 2002.

International Search Report for PCT/US02/02917 of Aug. 8, 2002.

International Search Report for PCT/US03/00155 of May 15, 2003.

NXI Communications, Inc., White Paper, NTS Security Issues, Oct. 15, 2001, pp. 1-12.

Mounji et al., Distributed Audit Trail Analysis, Proceedings of the Symposium of Network and Distributed System Security, San Diego, CA, Feb. 16-17, 1995, pp. 102-112.

Wobber et al., Authentication in the Taos Operating System, ACM Transactions on Computer Systems, vol. 12, No. 1, Feb. 1994, pp. 3-32.
Mayer et al., The Design of the Trusted Workstation: A True Infosec Product, 13th National Computer Security Conference, Washing, DC, Oct. 1-4, 1990, pp. 827-839.
Dawson, Intrusion Protection for Networks, Byte, Apr. 1995, pp. 171-172.
Buhkan, Checkpoint Charlie, PC Week Network, Nov. 27, 1995, pp. N1, N6-N7.
Process Software Technical Support Page, found on http://www.process.com/techsupport/whitesec.html, printed off of the Process Software website on Feb. 26, 2003, pp. 1-5.
Ganesan, BAfirewall: A Modern Firewall Design, Proceedings Internet Society Symposium on Network and Distributed System Security 1994, Internet Soc., 1994, pp. 99-108.
Lee, Trusted Systems, Chapter II-1-6 of Handbook of Information Security Management, Ed. Zella G. Ruthberg and Harold F. Tipton, Auerbach, Boston and New York, 1993, pp. 345-362.
Lunt, Automated Intrusion Detection, Chapter II-4-4 of Handbook of Information Security Management, Ed. Zella G. Ruthberg and Harold F. Tipton, Auerbach, Boston and New York, 1993, pp. 551-563.
Guha et al., Network Security via Reverse Engineering of TCP Code: Vulnerability Analysis and Proposed Solution, IEEE, Mar. 1996, pp. 603-610.
Garg et al., High Level Communication Primatives for Concurrent Systems, IEEE, 1988, pp. 92-99.
Hastings et al., TCP/IP Spoofing Fundamentals, IEEE, May 1996, pp. 218-224.
Snapp, Signature Analysis and Communication Issues in a Distributed Intrusion Detection System, Master Thesis, University of California, Davis, California, 1991, pp. 1-40.
Guha et al., Network Security via Reverse Engineering of TCP Code: Vulnerability Analysis and Proposed Solutions, IEEE, Jul. 1997, pp. 40-48.
Djahandari et al., An MBone for an Application Gateway Firewall, IEEE, Nov. 1997, pp. 72-81.
Kim et al., Implementing a Secure Login Environment: A Case Study of Using a Secure Network Layer Protocol, Department of Computer Science, University of Alabama, Jun. 1995, pp. 1-9.
Satyanarayanan, Integrating Security in a Large Distributed System, Acm Transaction on Computer Systems, vol. 7, No. 3, Aug. 1989, pp. 47-280.
Sammons, Nathaniel, "Multi-platform, Interrogation and Reporting with Rscan," The Ninth Systems Administration Conference, LISA 1995, Monterrey, California, Sep. 17-22, 1995, pp. 75-87.
Dean et al., "Java Security: From HotJava to Netscape and Beyond," Proceedings of the 1996 IEEE Symposium on Security and Privacy, May 6-8, 1996, Oakland, California, pp. 190-200.
Fisch et al., "The Design of an Audit Trail Analysis Tool," Proceedings of the 10th Annual Computer Security Applications Conference, Dec. 5-9, 1994, Orlando, Florida, pp. 126-132.
Safford et al., "The TAMU Security Package: An Ongoing Response to Internet Intruders in an Academic Environment," USENIX Symposium Proceedings, UNIX Security IV, Oct. 4-6, 1993, Santa Clara, California, pp. 91-118.
Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.
Casella, Karen A., "Security Administration in an Open Networking Environment," The Ninth Systems Administration Conference, LISA 1995, Monterrey, California, Sep. 17-22, 1995, pp. 67-73.
Burchell, Jonathan, "Vi-SPY: Universal NIM?" Virus Bulletin, Jan. 1995, pp. 20-22.
Benzel et al., "Identification of Subjects and Objects in a Trusted Extensible Client Server Architecture," 18th National Information Systems Security Conference, Oct. 10-13, 1995, Baltimore, Maryland, pp. 83-99.
Epstein et al., "Component Architectures for Trusted Netware," 18th National Information Systems Security Conference, Oct. 10-13, 1995, Baltimore, Maryland, pp. 455-463.
Varadarajan, Vijay, "Design and Management of a Secure Networked Administration System: A Practical Approach," 19th National Information Systems Security Conference, Oct. 22-25, 1996, Baltimore, Maryland, pp. 570-580.
Snapp et al., "DIDS (Distributed Intrusion Detection System)—Motivation, Architecture, and An Early Prototype," 14 th National Computer Security Conference, Oct. 1-4, 1991, Washington, DC, pp. 167-176.
Broner et al., "IntelligentI/O Rule-Based Input/Output Processing for Operating Systems," Operating Systems Review, vol. 25, No. 3, Jul. 1991, pp. 10-26.
Drews et al., "Special Delivery—Automatic Software Distribution Can Make You A Hero," Network Computing, Aug. 1, 1994, pp. 80, 82-86, 89, 91-95.
Morrissey, Peter, "Walls," Network Computing, Feb. 15, 1996, pp. 55-59, 65-67.
Harlander, Dr. Magnus, "Central System Administration in a Heterogenous Unix Environment: GeNUAdmin," Proceedings of the Eighth Systems Administration Conference (LISA VIII), Sep. 19-23, 1994, San Diego, California, pp. 1-8.
Shaddock et al., "How to Upgrade 1500 Workstations on Saturday, and Still Have Time to Mow the Yard on Sunday," The Ninth Systems Administration Conference LISA '95, Sep. 17-22, 1995, Monterrey, California, pp. 59-65.
Anderson, Paul, "Towards a High-Level Machine Configuration System," Proceedings of the Eighth Systems Administration Conference (LISA VIII), Sep. 19-23, 1994, San Diego, California, pp. 19-26.
Cooper, Michael A., "Overhauling Rdist for the '90s," Proceedings of the Sixth Systems Administration Conference (LISA VI), Oct. 19-23, 1992, Long Beach, California, pp. 175-188.
Vangala et al., "Software Distribution and Management in a Networked Enviroment," Proceedings of the Sixth Systems Administration Conference, Oct. 19-23, 1992, Long Beach, California, pp. 163-170.
Kim et al., "The Design Implementation of Tripwire: A File System Integrity Checker," 2nd ACM Conference on Computer and Communications Security, Nov. 2-4, 1994, Fairfax, Virgina, pp. 18-29.
Winn Schwartau, "e.Security™ -Solving 'Dumb Days' With Security Visualization," e-Security, Inc., Naples, FL 34103, 2000.
Anita D'Amico, Ph.D., "Assessment of Open e-Security Platform™ : Vendor-Independent Central Management of Computer Security Resource," Applied Visions, Inc., 1999.
"e.Security™ -Open Enterprise Security Management: Delivering an integrated, automated, centrally Managed Solution You Can Leverage Today and Tomorrow," e-Security, Inc., Naples, FL 34102, 1999.
"e.Security™ -Vision," e-Security, Inc., Naples, Fl, 1999.
"e.Security™ -Administrator Workbench™ ," e-Security, Inc. Naples, FL, 1999.
"e.Security™ -Fact Sheet," e-Security, Inc., Naples, FL, 1999.
"e.Security™ -Open e-Security Platform™ ," e-Security, Inc. Naples, FL, 1999.
Babcock, "E-Security Tackles The Enterprise," Jul. 28, 1999; Inter@ctive Week, www.Zdnet.com.
Kay Blough, "In Search of More-Secure Extranets," Nov. 1, 1999, www.InformationWeek.com.
Paul H. Desmond, "Making Sense of Your Security Tools," Software Magazine and Wiesner Publishing, www.softwaremag.com, 1999.
Kay Blough, "Extra Steps Can Protect Extranets," Nov. 1, 1999, www. InformationWeek.com.
Sean Hao, "Software protects e-commerce—e-Security's product alerts networks when hackers attack," Florida Today, Florida.
Scott Weiss, "Security Strategies—E-Security, Inc.," product brief, Hurwitz Group, Inc., Mar. 24, 2000.
Sean Adee, CISA, "Managed Risk, Enhanced Response—The Positive Impact of Real-Time Security Awareness," Information Systems Control Journal, vol. 2, 2000.
"Reprint Review—The Information Security Portal—Open e-Security Platform Verison 1.0", Feb. 2000, West Coast Publishing, SC Magazine, 1999.

"e.Security—Introducing the First Integrated, Automated, and Centralized Enterprise Security Management System," white paper, e-Security, Inc., Naples, FL 34102, 1999.
Ann Harrison, "Computerworld—Integrated Security Helps Zap Bugs," Feb. 21, 2000, Computerworld, vol. 34, No. 8, Framingham, MA
Shruti Daté, "Justice Department Will Centrally Monitor Its Systems For Intrusions," Apr. 3, 2000, Post-Newsweek Business Information, Inc., www.gcn.com.
e.Security™ , website pages (pp. 1-83), www.esecurityinc.com, e-Security, Inc., Naples, FL 34103, Sep. 14, 2000.
Peter Sommer, "Intrusion Detection Systems as Evidence," Computer Security Research Centre, United Kingdom.
Musman et al., System or Security Managers Adaptive Response Tool, DARPA Information Survivability Conference and Exposition, Jan. 25, 2000, pp. 56-68.
Gibson Research Corporation Web Pages, Shields Up!—Internet Connection Security Analysis, grc.com/default.htm, Laguna Hills, California, 2000.
Rouse et al., Design and Evaluation of an Onboard Computer-Based Information System fro Aircraft, IEEE Transactions of Systems, Man, and Cybernetics, vol. SMC-12, No. 4, Jul./Aug. 1982, pp. 451-463.
Hammer, An Intelligent Flight-Management Aid for Procedure Execution, IEEE Transactions on Systems, Man, and Cybernetics, vol. SMC-14, No. 6, Nov./Dec. 1984, pp. 885-888.
Mann et al., Analysis of User Procedural Compliance in Controlling a Simulated Process, IEEE Transactions on Systems, Man, and Cybernetics, vol. SMC-16, No. 4, Jul./Aug. 1986.
Todd, Signed and Delivered: An Introduction to Security and Authentication, Find Out How the Jave Security API Can Help you Secure your Code, Javaworld, Web Publishing, Inc., San Francisco, Dec. 1, 1998, pp. 1-5.
Arvind, Secure This. Inform, Association for Information and Image Management, Silver Spring, Sep./Oct. 1999, pp. 1-4.
Stevens, TCP/IP Illustrated, vol. 1, 1994, pp. 247.
Lee et al., A Generic Virus Detection Agent on the Internet, IEEE, 30th Annual Hawaii International Conference on System Sciences, 1997, vol. 4.
Cutler, Inside Windows NT, 1993, Microsoft Press.
Duncan, Advanced MS-Dos, 1986, Microsoft Press.
McDaniel, IBM Dictionary of Computing, 1994, International Business Machines Corporation.
Burd, Systems Architecture, 1998, Course Technology, Second Edition.
Programmer's Guide PowerJ, 1997, Sybase.
Swimmer et al., Dynamic detection and classification of computer viruses using general behavior patterns, 1995, Proceedings of the Fifth International Virus Bulletin Conference, Boston.
Advanced Virus Detection Technology for the Next Millenium, Aug. 1999, Network Associates, A Network Associates Executive White Paper, pp. 1-14.
Enterprise-Grade Anti-Virus Automation in the 21th Century, Jun. 2000, Symantec, Technology Brief, pp. 1-17.
Kephart et al., Blueprint for a Computer Immune System, 1997, Retrieved from Internet, URL: http//www.research.ibm.com/antivirus/scipapers/kephart/VB97, pp. 1-15.
Richardson, Enterprise Antivirus Software, Feb. 2000, Retrieved from Internet, URL: http://www.networkmagazine.com/article/nmg20000426S0006, pp. 1-6.
Understanding and Managing Polymorphic Viruses, 1996, Symantec, The Symantec Enterprise Papers, vol. XXX, pp. 1-13.
Gong, JavaTM Security Architecture (JDK1.2), Oct. 2, 1998, Sun Microsystems, Inc., Version 1.0, pp. i-iv, 1-62.
Softworks Limited VBVM Whitepaper, Nov. 3, 1998, Retrieved from the Internet, URL: http://web.archive.org/web/19981203105455/http://softworksltd.com/vbvm.html, pp. 1-4.
Kephart, A Biologically Inspired Immune System for Computers, 1994, Artificial Life IV, pp. 130-139.
International Search Report for PCT/US01/26804 of March 21, 2002.
Kosoresow et al., Intrusion Detection via System Call Traces, IEEE Software, pp. 35-42, Sep./Oct. 1997.
Veldman, Heuristic Anti-Virus Technology, Proceedings, 3rd International Virus Bulletin Conference, pp. 67-76, Sep. 1993.
Symantec, Understanding Heuristics: Symantec's Bloodhound Technology, Symantec White Paper Series, vol. XXXIV, pp. 1-14, Sep. 1997.
Nachenberg, A New Technique for Detecting Polymorphic Computer Viruses, A thesis submitted in partial satisfaction of the requirements for the degree Master of Science in Computer Science, University of California Los Angeles, pp. 1-127, 1995.
Microsoft P-Code Technology, http://msdn.microsoft.com/archive/default.asp?url=/archive/en-us/dnarvc/html/msdn_c7pcode2.asp, pp. 1-6, Apr. 1992.
DJFPP COFF Spec, http://delorie.com/digpp/doc/coff/, pp. 1-15, Oct. 1996.
Natvig, Sandbox Technology Inside AV Scanners, Virus Bulletin Conference, Sep. 2001, pp. 475-488.
Norman introduces a new technique for eliminating new computer viruses, found on Norman's website, file://c:/documents%20and%20settings\7489\local%20settings\temporary%20internet%20files\olk, pp. 1-2 published Oct. 25, 2001, printed from website Dec. 27, 2002.
International Search Report for PCT/US01/19142 of Jan. 17, 2003.
Using the CamNet BBS FAQ, http://www.cam.net.uk/manuals/bbsfaq/bbsfaq.htm, Jan. 17, 1997.
NASIRE, NASIRC Bulletin #94-10, http://cs-www.ncsl.nist.gov/secalert/nasa/nasa9410.txt, Mar. 29, 1994.
Packages in the net directory, http://linux4u.jinr.ru/usoft/WWW/www_debian.org/FTP/net.html, Mar. 20 1997.
Sundaram, An Introduction to Intrusion Detection, Copyright 1996, published at www.acm.org/crossroads/xrds2-4/intrus.html, pp. 1-12.
Samfat, IDAMN: An Intrusion Detection Architecture for Mobile Networks, IEEE Journal on Selected Areas in Communications, vol. 15, No. 7, Sep. 1997, pp. 1373-1380.
INFO: Visual Basic Supports P-Code and Native Code Compilation (Q229415), http://support.microsoft.com/support/kb/articles/Q229/4/15.ASP, pp. 1-2, Apr. 28, 1999.
International Search Report for PCT/US99/29117 of May 2, 2000.
Nordin, U of MN OIT Security and Assurance, Feb. 9, 2000.
Internet Security Systems, RealSecure SiteProtector, SAFEsuite Decisions to SiteProtector Migration, Aug. 8, 2003, pp. 1-42.
Internet Security Systems, SAFEsuite Enterprise, SAFEsuite Decisions, 1998.
Internet Security Systems, SAFEsuite Enterprise, Recognizing the Need for Enterprise Security: An Introduction to SAFEsuite Decisions, Aug. 1998, pp. 1-9.
Internet Security Systems, SAFEsuite Decisions 2.6, Frequently Asked Questions, Feb. 21, 2001, pp. 1-10.
Internet Security Systems, SAFEsuite Decisions Version 1.0, User's Guide, 1998, pp. 1-78.
Porras et al., Emerald: Event Monitoring Enabling Reponses to Anomalous Live Disturbances, Computer Science Laboratory, SRI International, Menlo Park, CA, Oct. 1997, pp. 353-365.
Cisco Systems, Empowering the Internet Generation, 1998.
Messmer, Start-Up Puts Hackers on BlackICE, Network World Fusion, http://www.nwfusion.com/cgi-bin/mailto/x/cgi, Apr. 21, 1999, pp. 1-2.
NetworkICE Corporation, Can You Explain How Your Product Can Protect a Remote User with a VPN Client?, 1998-1999, pp. 1-2, http://www.webarchive.org/web/20000304071415/advice.networkice.com/advice/support/kb/q000003/default.
Yasin, Start-Up Puts Network Intruders on Ice, http://www.internetweek.com/story/INW19990505S0001, May 5, pp. 1-2.
Morency, NetworkWorldFusion, http://nwfusion.com/cgi-bin/mailto/x.cgi, Jun. 28, 1999, pp. 1-2.
Rogers, Network ICE Touts Security Wares, Apr. 23, 1999, San Mateo, California, http://www.crn.corn/showArticle.jhtml?articleID=18829106&flatPage=true, pp. 1-2.
Rogers, Network ICE Signs Resellers, May 26, 1999, San Mateo, California, http://www.crn.com/showArticle.jhtml?articleID=18805302&flatPage=true, pp. 1-2.

Internet Security Systems, I've Been Attacked! Now What?, Aug. 27, 1999, http://www.iss.net/security_center/advice/Support/KB/q000033/default.htm, pp. 1-2.
Internet Security Systems, What is the Format of "Attack-List. CSV"?, Aug. 21, 1999, http://www.iss.net/security_center/advice/Support/KB/q000018/default.htm, pp. 1-2.
Neumann et al., Experience with Emerald to Date, Apr. 11-12, 1999, 1st USENIX Workshop on Intrusion Detection and Network Monitoring, Santa Clara, California, pp. 1-9.
Lindqvist et al., Detecting Computer and Network Misuse Through the Production-Based Expert System Toolset (P-BEST), May 9-12, 1999, Proceedings of the 1999 IEEE Symposium on Security and Privacy, Oakland, California, pp. 1-16.
Kendall, A Database of Computer Attacks for the Evaluation of Intrusion Detection Systems, Jun. 1999, Department of Defense Advanced Research Projects Agency, pp. 1-124.
Neumann, Computer Security and the U.S. Infrastructure, Nov. 6, 1997, Congressional Testimony, pp. 1-11.
Porras et al., Life Traffic Analysis of TCP/IP Gateways, Nov. 10, 1997, Internet Society's Networks and Distributed Systems Security Systems Symposium, Mar. 1998, http://www.sdl.sri.com/projects/emerald/live-traffic.html, pp. 1-16.
Raynaud et al., Integrated Network Management IV; 1995, Proceedings of the 4th International Symposium on Integrated Network Management, pp. 1-2 and 5-16.
Heberlein et al., A Method to Detect Intrusive Activity in a Networked Environment, Oct. 1-4, 1991, 14th National Computer Security Conference, Washington, D.C., pp. 362-363 and 365-371.
Ko et al., Execution Monitoring of Security-Critical Programs in Distributed Systems: A Specification-Based Approach, 1997, Proceedings of the 1997 IEEE Symposium on Security and Privacy, pp. 175-187.
Crosbie et al., Active Defense of a Computer System Using Autonomous Agents, Technical Report No. 95-008, Feb. 15, 1995, Purdue University, West Lafayette, Indiana, pp. 1-14.
Mansouri-Samani et al., Monitoring Distributed Systems, Nov. 1993, IEEE Network, pp. 20-30.
Jakobson et al., Alarm Correlation, Nov. 1993, IEEE Network, pp. 52-59.
Anderson et al., Next-Generation Intrusion Detection Expert (NIDES), A Summary, May 1995, SRI International, pp. 1-37.
Vertias Software, Press Release, Robust Enhancements in Verison 6.0 Maintain Seagate WI as the De Facto Standard for Software Distribution, Oct. 6, 1997, Press Release, pp. 1-4, http://216.239.39.104/search?q=cache:HS9kmK1m2QoJ:www.veritas.com/us/aboutus/pressroom/199....
Yasin, Network-Based IDS are About to Stop Crying Wolf, Security Mandate: Silence False Alarms, Apr. 9, 1999, http://lists.jammed.com/ISN/1999/04/0021.html, pp. 1-3.
Internet Security Systems, Press Release, ISS Reports Record Revenues and Net Income for Second Quarter, Jul. 19, 1999, http://bylive01.iss.net/issEn/delivery/prdetail.isp?type=Financial&oid=14515, pp. 1-5.
LaPadula, State of the Art in CyberSecurity Monitoring, A Supplement, Sep. 2001, Mitre Corporation, pp. 1-15.
Balasubramaniyan et al., An Architecture for Intrusion Detection Using Automomous Agents, Jun. 11, 1998, Purdue University, West Lafayette, Indiana, pp. 1-4, http://gunther.smeal.psu.edu/images/b9/f3/bb/9e/ba7f39c3871dcedeb9abd0f70cb84607/1.png.
Crosbie et al., Active Defense of a Computer System Using Autonomous Agents, Feb. 15, 1995, Technical Report No. 95-008, Purdue University, West Lafayette, Indiana, pp. 1-14.
Crosbie et al., Defending a Computer System Using Autonomous Agents, Mar. 11, 1994, Technical Report No. 95-022, Purdue University, West Lafayette, Indiana, pp. 1-11.
Denning, An Intrusion-Detection Model, Feb. 1987, IEEE Transactions on Software Engineering, vol. SE-13, No. 2, pp. 1-17.
Lunt, A Survey of Intrusion Detection Techniques, 1993, Computers & Security, 12 (1993), pp. 405-418.
Porras et al., Penetration State Transition Analysis A Rule-Based Intrusion Detection Approach, 1992, pp. 220-229.
Javitz et al., The NIDES Statistical Component: Description and Justification, SRI International, Menlo Park, California, SRI Project 3131, Mar. 7, 1994.
Lindqvist et al., Detecting Computer and Network Misuses Through the Production-Based Expert System Toolset (P-BEST), Oct. 25, 1998, pp. 1-20.
Javitz et al., The SRI IDES Statistical Anomaly Detector, SRI Internationa, Menlo Park, California, May 1991, IEEE Symposium on Security and Privacy, pp. 1-11.
Porras et al., Live Traffic Analysis of TCP/IP Gateways, Nov. 10, 1997, SRI International, Menlo Park, California, pp. 1-16.
Porras et al., Live Traffic Analysis of TCP/IP Gateways, Dec. 12, 1997, SRI International, Menlo Park, California, Proceedings of the 1998 ISOC Symposium on Network and Distributed Systems Security, pp. 1-13.
Information & Computing Sciences: System Design Laboratory: Programs: Intrusion Detection, SRI International, http://www.sdl.sri.com/programs/intrusion/, Jun. 17, 2004, pp. 1-2.
Lindvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference, pp. 1-12.
Almgren et al., Application-Integrated Data Collection for Security Monitoring, Oct. 10-12, 2001, SRI International, Menlo Park, California, pp. 1-15.
Debar et al., Research Report: A Revised Taxonomy for Intrusion-Detection Systems, Oct. 25, 1999, IBM Research, Switzerland, pp. 1-23.
Porras et al., Emerald: Event Monitoring Enabling Responses to Anomalous Live Disturbances, Computer Science Laboratory, SRI International, Menlo Park, CA, Dec. 18, 1996, pp. 1-3.
Frequently-Asked Questions about RealSecure, pp. 1-14, http://web.archive.org/web/19970721183227/iss.net/prod/rs_faq.html, May 30, 1997.
Cisco Systems, Inc., Empowering the Internet Generation, 1998.
Internet Security Systems, Inc., RealSecure Release 1.2 for UNIX, A User Guide and Reference Manual, 1997.
Internet Security Systems, Inc., Real-time attack recognition and response: A solution for tightening network security, Jan. 1997, pp. 1-13.
Internet Security Systems, Inc., SAFEsuite Decisions User Guide, Version 1.0, 1998, pp. 1-78.
NetworkICE Corporation, ICEcap Administrator's Guide, Version 1.0 Beta, 1999, pp. 1-142.
Debar, Herve et al., A Neural Network Component for an Intrusion Detection System, 1992, pp. 240-250.
SRI International, A Prototype IDES: A Real-Time Intrusion-Detection Expert System, Aug. 1987, pp. 1-63.
SRI International, Requirements and Model For IDES-A Real-Time Intrusion-Detection Expert System, Aug. 1985, pp. 1-70.
SRI International, An Intrusion-Detection Model, Nov. 1985, pp. 1-29.
Dowell et al., The ComputerWatch Data Reduction Tool, Proc. of the 13th National Computer Security Conference, Washington, D.C., Oct. 1990, pp. 99-108.
Fox et al., A Neural Network Approach Towards Intrusion Detection, July 2, 1990, pp. 125-134.
Garvey et al., Model-Based Intrusion Detection, Oct. 1991, pp. 1-14.
Ilgun et al. State Transition Analysis: A Rule-Based Intrusion Detection Approach, Mar. 1995, pp. 181-199.
Javitz et al., The SRI IDES Statistical Anomaly Detector, May 1991, pp. 1-11.
SRI International, The NIDES Statistical Component Description and Justification, Mar. 7, 1994, pp. 1-46.
Karen, Oliver, PC Magazine, The Digital Doorman, Nov. 16, 1999, pp. 68.
Liepins et al., Anomaly Detection: Purpose and Framewrk, 1989, pp. 495-504.
Lindqvist et al., Detecting Computer and Network Misuse Through the Production-Bases Expert System Toolset (P-BEST), Oct. 25, 1998, pp. 1-20.

Lunt, Teresa, A survey of intrusion detection techniques, 1993, pp. 405-418.
Lunt, Teresa, Automated Audit Trail Analysis and Intrusion Detection: A Survey, Oct. 1988, pp. 1-8.
Sebring et al., Expert Systems in Intrusion Detection: A Case Study, Oct. 1988, pp. 74-81.
Shieh et al., A Pattern-Oriented Intrusion-Detection Model and Its Applications, 1991, pp. 327-342.
Smaha, Stephen, Haystack: An Intrusion Detection System, 1988.
Snapp, Steven Ray, Signature Analysis and Communication Issues in a Distributed Intrusion Detection System, 1991, pp. 1-40.
Porras et al., Emerald: Event Monitoring Enabling Responses to Anomalous Live Disturbances, Oct. 1997, pp. 353-365.
Lunt et al., Knowledge-Based Intrusion Detection, Mar. 1989, pp. 102-107.
Lunt et al., An Expert System to Classify and Sanitize Text, Dec. 1987, pp. 1-5.
Tener, William, Computer Security in the Age of Information, AI & 4GL: Automated Detection and Investigation Tools, 1989, pp. 23-29.
Teng et al., Adaptive Real-time Anomaly Detection Using Inductively Generated Sequential Patterns, 1990, pp. 278-284.
Vaccaro et al., Detection of Anomalous Computer Session Activity, 1989, pp. 280-289.
Winkler, J.R., A UNIX Prototype for Intrusion and Anomaly Detection in Secure Networks, 1990, pp. 115-124.
Boyen et al. Tractable Inference for Complex Stochastic Process, Jul. 24-26, 1998.
Copeland, Observing Network Traffic—Techniques to Sort Out the Good, the Bad, and the Ugly, 2000, pp. 1-7.
Goan, Terrance, Communications of the ACM, A Cop on the Beat Collecting and Appraising Intrusion Evidence, Jul. 1999, pp. 47-52.
Heberlein et al., A network Security Monitor, 1990, pp. 296-304.
Jackson et al., An Expert System Applications for Network Intrusion Detection, Oct. 1991, pp. 1-8.
Lankewicz et al., Real-Time Anomaly Detection Using a Nonparametric Pattern Recognition Approach, 1991, pp. 80-89.
Lippmann et al., Evaluating Intrusion Detection Systems: The 1998 DARPA Off-line Intrusion Detection Evaluation, 1999.
Munson et al., Watcher: The Missing Piece of the Security Puzzle, Dec. 2001.
Pearl, Judea, Probabilistic Reasoning in Intelligent Systems: Networks of Plausible Inference, Sep. 1988.
Porras et al., Live Traffic Analysis of TCP/IP Gateways, Dec. 12, 1997, pp. 1-13.
EMERALD TCP Statitical Analyzer 1998 Evaluation Results, http://www.sdl.sri.com/projects/emerald/98-eval-estat/index.html, Jul. 9, 1999, pp. 1-15.
Staniford-Chen, GrIDS-A Graph Based Intrusion Detection System for Large Networks, Oct. 1996.
Tener, William, Discovery: An Expert System in the Commercial Data Security Environment, Dec. 1986, pp. 45-53.
Valdes et al., Adaptive, Model-Based Monitoring for Cyber Attack Detection, 2000, pp. 1-19.
SRI International, Blue Sensors, Sensor Correlation, and Alert Fusion, Oct. 4, 2000.
Valdes et al., Statistical Methods for Computer Usage Anomaly Detection Using NIDES, Jan. 27, 1995, pp. 306-311.
Wimer, Scott, The Core of CylantSecure, http://www.cylant.com/products/core.html, 1999, pp. 1-4.
Zhang et al., A Hierarchical Anomaly Network Intrusion Detection System using Neural Network Classification, Feb. 2001.
Cisco Secure Intrusion Detection System 2.1.1 Release Notes, http://www.cisco.com/univercd/cc/td/doc/product/iaabu/csids/scids3/nr211new.htm, Jun. 10, 2003, pp. 1-29.
Linux Weekly News, http://lwn.net/1998/0910shadow.html, Sep. 8, 1998, pp. 1-38.
Cracker Tracking: Tighter Security with Intrucsion Detection, http://www.byte.com/art/9805/sec20/art1.htm, May 1998, pp. 1-8.
Cisco Systems, Inc., Network RS: Intrusion Detection and Scanning with Active Audit Session 1305, 1998.
Business Security Advisor Magazine, Intrusion Detection Systems: What You Need to Know, http://advisor.com/doc/0527, Sep. 1998, pp. 1-7.
Garvey et al., An Inference Technique for Integrating Knowledge from Disparate Sources, Multisensor Integration and Fusion for Intelligenct Machines and Systems, 1995, pp. 458-464.
Power et al., CSI Intrusion Detection System Resource, Jul. 1998, pp. 1-7.
Cisco Systems, Inc., NetRanger User's Guide Verison 2.1.1, 1998.
Internet Security Systems, Real-Time Attack Recognition and Response: A Solution for Tightening Network Security, http://www.iss.net, 1997, pp. 1-13.
Network ICE Corporation, Network ICE Product Documentation, pp. 1-3, http://www.web.archive.org/web/20011005080013/www.networkice.com/support/documentation.html, Jul. 6, 2004.
Network ICE Corporation, Network ICE Documentation, p. 1, http:/www.web.archive.org./web/19991109050852/www.networkice.com/support/docs.htm, Jul. 6, 2004.
Network ICE Corporation, Network ICE Press Releases, p. 1, http://www.web.archive.org/web/19990903214428/www.netice.com/company/pressrelease/press.htm, Jul. 7, 2004.
Network ICE Corporation, Network ICE Press Releases, p. 1, http://www.web.archive.org/web/20000304074934/www.netice.com/company/pressrelease/press.htm, Jul. 7, 2004.
Brentano et al., An Architecture for Distributed Intrusion Detection System, Department of Energy Computer Security Group 14th Annual Conference Proceedings, pp. (17)25-17(45), May 1991.
Staniford-Chen et al., GrIDS-A Graph Based Intrusion Detection System for Large Networks, University of California, Davis, California, 19th National Information Systems Security Conference, 1996, pp. 1-10.
Ricciulli et al., Modeling Correlated Alarms in Network Management Systems, SRI International, Menlo Park, California, Proceedings of the Conference on Communication Networks and Distributed System Modeling and Simulation, 1997, pp. 1-8.
Porras et al., Emerald: Event Monitoring Enabling Responses to Anomalous Live Disturbances, SRI International, Menlo Park, California, 20th National Information Systems Security Conference, Oct. 1997, pp. 1-24.
Porras et al., A Mission-Impact Based Approach to INFOSEC Alarm Correlation, SRI International, Menlo Park, California, Oct. 2002, pp. 1-33.
Phrack 55 Download (234 kb, Sep. 9, 1999), http://www.phrack.org/show.php?p=55&a=9, pp. 1-6.
Porras et al., A Mission-Impact-Based Approach to INFOSEC Alarm Correlation, SRI International, Menlo Park, California, Oct. 2002, pp. 1-19.
Bace, An Introduction to Intrusion Detection and Assessment for System and Network Security Management, 1999, pp. 1-38.
Hunteman, Automated Information System—(AIS) Alarm System, University of California, Los Alamos National Laboratory, 20th National Information System Security Conference, Oct. 1997, pp. 1-12.
Janakiraman et al., Indra: A Peer-to-Peer Approach to Network Intrusion Detection and Prevention, Proceedings of the 12th International Workshop on Enabling Technologies: Infrastructure for Collaborative Enterprises, 2003, pp. 1-5.
Innella, Intrusion Detection Systems (IDS), Navy Information Assurance, Jun. 28, 2004, pp. 1-4, http://www.infosec.navy.mil/ps/?t=infosecprodsservices/infosecprodsservices.tag&bc=/infosecprodsservices/b....
Curry, Intrusion Detection Systems, IBM Emergency Response Service, Coast Laboratory, http://www.cerias.purdue.edu/about/history/coast_ resources/idcontent/ids.html, Jul. 19, 2004, pp. 1-28.
Lunt et al., Knowledge-Based Intrusion Detection SRI International, Menlo Park, California, Conference on AI Systems in Government, Washington, D.C., Mar. 1989, pp. 102-107.
A. Information Assurance BAA 98-34 Cover Sheet, SRI International, Nov. 1, 2000, pp. 2-35.
NetScreen Products, FAQ, http://www.netscreen.com./products/faq.html, Feb. 28, 2003, pp. 1-6.

Miller, A Network Under Attack: Leverage Your Existing Instrumentation to Recognize and Respond to Hacker Attacks, NetScout Systems, Westford, MA, Apr. 2003, pp. 1-8.
Technology Brief: Intrusion Detection for the Millennium, Internet Security Systems, 2000, pp. 1-6.
Weiss et al., Analysis of Audit and Protocol Data using Methods from Artificial Intelligence, Siemens AG, Munich, Germany, Proc. of the 13th National Computer Security Conference, Washington, D.C., Oct. 1990, pp. 109-114.
Snapp et al., DIDS (Distributed Intrusion Detection System)—Motivation, Architecture, and an Early Protype), University of California, Davis California, , Proc. 14th National Computer Security Conference, Washington, D.C., Oct. 1991, pp. 167-176.
Internet Security Systems, Inc., SAFEsuite Enterprise Edition, Project "Gatekeeper" 1.0, Market Requirements Document, Mar. 30, 1998, pp. 1-12.
Internet Security Systems, SAFEsuite Decisions, 2000, pp. 1-2.
Internet Security Systems, Dynamic Threat Protection, Presse-Roundtable, Munich, Germany, Apr. 10, 2003, pp. 1-63.
Internet Security Systems, Preliminary ODM 1.0 Functional Specification, Aug. 1997, pp. 1-7.
Internet Security Systems, Inc., Scanner-ISSDK Interface, Design Specification, Jun. 2, 2000, Draft 1.07, pp. 1-7.
RealSecure, Adaptive Network Security Manager Module Programmer's Reference Manual, pp. 1-74.
Advanced Concept Technology Demonstrations (ACTD), 2005, pp. 1-28.
Frank, Sounding the Alarm, Sep. 6, 1999, Federal Computer Week, pp. 1-2.
Crumb, Intrusion Detection Systems to be Integrated at AFRL, Air Force Research Laboratory, News@AFRL, Fall 1999, pp. 1.
Temin, Case Study: The IA: AIDE System at Two, 15th Annual Computer Security Applications Conference, Dec. 6-10, 1999, Phoenix, Arizona, pp. 1-26.
Spink, Automated Intrusion Detection Environment (AIDE), Intrusion Detection Sensor Fusion, Sep. 7, 1999, pp. 1-25.
Frincke et al., A Framework for Cooperative Intrusion Detection, 21st National Information Systems Security Conference, Oct. 6-9, 1998, Crystal City, Virginia, pp. 1-20.
Anderson et al., In Athena's Camp: Preparing for Conflict in the Information Age, An Exploration of Cyberspace Security R&D Investment Strategies for DARPA: The Day After-in Cyberspace II, Chaper Eleven, 1996, pp. 253-271.
Valdes et al., SRI International, Probabilistic Alert Correlation, 2001, pp. 1-15.
Bass, Multisensor Data Fusion for Next Generation Ditributed Intrusion Detection Systems, Apr. 28, 1999, Iris National Symposium, pp. 1-6.
Perrochon et al., Enlisting Event Patterns for Cyber Battlefield Awareness, No Date, Stanford University, pp. 1-12.
Perrochon, Using Context-Based Correlation in Network Operations and Management, Jul. 2, 1999, Stanford University, pp. 1-20.
Perrochon, Real Time Event Based Analysis of Complex Systems, Jun. 1998, pp. 1-9.
Luckham et al., Complex Event Processing in Distributed Systems, Aug. 18, 1988, Stanford University, pp. 1-26.
Pettigrew, US Southcom United States Southern Command's Information Sharing Projects, Summer 1999, IAnewsletter, vol. 3, No. 1, pp. 1-24.
Levitt et al., CMAD IV, Computer Misuse & Anomaly Detection, Session Summaries, Nov. 12-14, 1996, Proceedings of the Fourth Workshop on Future Directions in Computer Misuse and Anomaly Detection, Monterey, California, pp. 1-86.
Cheung et al., The Design of GrIDS: A Graph-based Intrusion Detection System, Jan. 26, 1999, University of California, pp. 1-51.
Cohen et al., Report of Reporting and Analysis Track, Detection of Malicious Code, Intrusions, and Anomalous Activities Workshop, Feb. 22-23, 1999, pp. 1-47.
Garofalakis et al., Network Mining and Analysis: The Nemesis Project, Bell Labs, Lucent Technologies, No Date, pp. 1-12.
RealSecure ICEcap Manager User Guide Version 3.6, Internet Security Systems, Inc., 1998-2002, pp. 1-228.
Cuppens, Cooperative Intrusion Detection, Date Unknown, pp. 1-10.
Mukherjee et al., Network Intrusion Detection, IEEE Network, May/Jun. 1994, pp. 26-41.
Machlis, Net Monitoring Tools Gain Real-Time Alerts, Apr. 14, 1997, http://www.computerworld.com, pp. 1-12.
OmniGuard/ITA Intruder Alert, AXENT Technologies, Inc., Nov. 17, 2004, http://www.web.archive.org, pp. 1-10.
NetRanger Overview, Chapter 1, Date Unknown, pp. 1-16.
Sutterfield, Large-Scale Network Intrusion Detection, 1997, WheelGroup Corporation, pp. 1-10.
Kumar et al., An Application of Pattern Matching in Intrusion Detection, Technical Report No. CSD-TR-94-013, Jun. 17, 1994, Purdue University, pp. 1-55.
Huang et al., A Large-Scale Distributed Intrusion Detection Framework Based on Attack Strategy Analysis, Date Unknown, The Boeing Company, pp. 1-12.
Perrochon et al., Event Mining with Event Processing Networks, Date Unknown, Stanford University, pp. 1-4.
Gruschke, Integrated Event Management: Event Correlation Using Dependency Graphs, presented at DSOM 1998, University of Munich, pp. 1-12.
Bass, Intrusion Detection System and Multisensor Data Fusion, Apr. 2000, Communications of the ACM, vol. 43, No. 4, pp. 99-105.
Bass et al., A Glimpse into the Future of ID, Date Unknown, Usenix, pp. 1-10.
LaPadula, State of the Art in Anomaly Detection and Reaction, Jul. 1999, Mitre Corporation, pp. 1-36.
Rationalizing Security Events with Three Dimensions of Correlation, Date Unknown, NetForensics, Tech Brief, pp. 1-6.
Jou et al., Design and Implementation of a Scalable Intrusion Detection Systems for the Protection of Network Infrastructure, Date Unknown, MCNC, pp. 1-15.
Caldwell, Event Correlation: Security's Holy Grail?, Aug. 1, 2002, GuardedNet, pp. 1-21.
Metcalf et al., Intrusion Detection System Requirements, Sep. 2000, Mitre Corporation, pp. 1-33.
Jou et al., Architecture Design of Scalable Intrusion Detection System for the Emerging Network Infrastructure, Technical Report CDRL A005, Apr. 1997, MCNC, pp. 1-42.
Security Manager for UNIX Systems Version 3.2.1 User's Guide, Feb. 1998, Internet Security Systems, pp. 1-162.
RealSecure Release 1.2 for UNIX A User Guide and Reference Manual, 1997, Internet Security Systems, Inc., pp. 1-92.
Internet Scanner SAFE SAFEsuite 4.0 User Guide and Reference Manual, 1996, Internet Security Systems, Inc., pp. 1-158.
Internet Scanner 3.3 User Guide and Reference Manual, 1996, Internet Security Systems, Inc., pp. 1-119.
Landwehr et al., Newsletter of the IEEE Computer Society's TC on Security and Privacy Electronics, Electronic CIPHER, Nov. 25, 1997, Issue 25, pp. 1-34.
20th National Information System Security Conference, Oct. 6-10, 1997, Baltimore, Maryland, pp. 1-44.
EMERALD Alert Management Interface User's Guide Version 1.2, Dec. 6, 2000, SRI International, pp. 1-11.
Anderson et al., Detecting Unusual Program Behavior Using the Statistical Component of the Next-Generation Intrusion Detection Expert System (NIDES), May 1995, SRI International, pp. 1-89.
Lunt et al., Detecting Intruders in Computer Systems, 1993 Conference on Auditing and Computer Technology, SRI International, pp. 1-17.
Network ICE Products—ICEcap, Date Unknown, pp. 1-2.
Forlanda, The Secrets to Driving on BlackICE, Jan. 12, 2000, Network ICE, pp. 1-35.
BlackICE User's Guide Version 1.0 Beta Draft, 1999, Network ICE Corporation, pp. 1-59.
ICEcap Administrator's Guide Version 1.0 Beta Draft, 1999, Network ICE Corporations, pp. 1-25.
Shulak et al., ICEcap Advanced Administration Guide Version 3.0, 2001, Internet Security Systems Corporation, pp. 1-51.
"Real Secure, OS Sensor User Guide," Version 5.0, © Internet Security Systems, Inc. 199?-2000; Sep. 2000, pp. 1-64.

"Real Secure, User's Guide," Version 3.0, © 1992-1998, Internet Security Systems, Inc., pp. 1-128.
"System Security Scanner, User Guide," Version 1.6, © 1996-1998, Internet Security Systems, Inc., pp. 1-164.
"Real Secure™, Network Engine User Guide," Version 3.2.1, © 1999 by Internet Security Systems, Inc., pp. 1-38.
"Real Secure™, User Guide," Version 3.2.1, © by Internet Security Systems, Inc., pp. 1-38.
"Real Secure™, Management for HP Open View User Guide," Version 1.3, © 1999 by Internet Security Systems, Inc., pp. 1-48.
"Database Scanner, User Guide," Version 2.0, © 1992-1999, Internet Security Systems, Inc., pp. 1-112.
"Database Scanner™, User Guide," Version 4.0, © 2000 by Internet Security Systems, Inc., pp. 1-122.
"Database Scanner™, User Guide," Version 3.0.1, © 1999 by Internet Security Systems, Inc., pp. 1-164.
"Real Secure™, Network Sensor User Guide," Version 5.0, © 2000 by Internet Security Systems, Inc., pp. 1-42.
"Real Secure, Server Sensor User Guide," Version 5.5, © Internet Security Systems, Inc. 2000, pp. 1-56.
"Internet Scanner™, User Guide," Version 6.0, Copyright © 1999 by Internet Security Systems, Inc., pp. 1-182.
"Internet Scanner™, User Guide," Version 6.1, © 2000 by Internet Security Systems, Inc., pp. 1-226.
"Internet Scanner™, User Guide," Version 5.6, © 1992-1998, Internet Security Systems, Inc., pp. 1-162.
"Internet Scanner™, User Guide," Version 5.3, © 1992-1998, Internet Security Systems, Inc. pp. 1-173.
"Real Secure, Console User Guide," Version 5.5, © 199?-2000, Internet Security Systems, Inc., pp. 1-162.
"Internet Scanner™, User Guide," Version 5.8, © 1999 by Internet Security Systems, Inc., pp. 1-148.
"SAFEsuite Decisions, User Guide," Version 1.0, © 1992-1998, Internet Security Systems, Inc., pp. 1-88.
"Real Secure™, Console User Guide," Version 5.0, © 2000 by Internet Security Systems, Inc., pp. 1-114.
"SAFEsuite DECISIONS, User Guide," Version 2.5, © 2000 by Internet Security Systems, Inc., pp. 1-194.
"System Scanner, User Guide," Version 1.7, © 1992-1998, Internet Security Systems, Inc., pp. 1-248.
"System Scanner, User Guide," Version 1.0, © 1996-1998, Internet Security Systems, Inc., pp. 1-140.
"Secure Scanner™, User Guide," Version 4.0, © 1999 Internet Security Systems, Inc., pp. 1-178.
Internet Security Systems, Inc., "Introduction to RealSecure Version 5.0, The Industry's Only Integrated Host-Based and Network-Based Intrusion Detection System", Aug. 22, 2000, pp. 1-47.
Internet Security Systems, Inc., "Real Secure Network Sensor and Gigabit Network Sensor Policy Guide Version 7.0 ", Aug. 2003, pp. 1-86.
Internet Security Systems, Inc., "RealSecure Console User Guide Version 3.1", Jun. 1999, pp. 1-98.
Internet Security Systems, Inc., "RealSecure Version 2.0", Apr. 1998, pp. 1-154.
Internet Security Systems, Inc., "Enhanced Dynamic Threat Protection via Automated Correleation and Analysis", an ISS White Paper, 2002, pp. 1-4.
Internet Security Systems, Inc., "RealSecure Site Protector Comparison Guide For Internet Scanner 7.0 Reporting Version 1.2", Mar. 2003, an ISS Tech Note, pp. 1-15.
Internet Security System, Inc., "RealSecure Site Protector Comparison Guide for ICEcap Manager Version 1.5", Jan. 2002, an ISS Technical White Paper, pp. 1-27.
Internet Security Systems, Inc., "RealSecure SiteProtector Security Fusion Module 2.0 Frequently Asked Questions", Mar. 2003, pp. 1-8.
Internet Security Systems, Inc., "RealSecure SiteProtector Console User Reference Guide Verison 2.0 Service Pack 1", Mar. 14, 2003, Chapter 3, pp. 1-27.
Internet Security Systems, Inc., "Proventia Gateway and Network Protection", Jul. 2003, pp. 1-12.
Farley, Internet Security System, Inc., "ID Fusion Technology, A First-Generation Approach", Apr. 29, 1999, National Security Framework Forum, pp. 1-8.
Farley, "RealSecure Fusion Engine Concepts", an ISS White Paper, Jun. 30, 1999, pp. 1-23.
McGraw et al., "Secure Computing with Java: Now and the Future", 1997, http://java.sun.com/security/javaone97-whitepaper.html, pp. 1-20.

* cited by examiner

Contextual Information for Data Signature Evaluation

| Data Signature | Context | Severity/Alert Condition (0-5) |
|---|---|---|
| "/cgi-bin/phf" | HTTP URL | 4 |
| "/cgi-bin/phf" | Email header | 0 |
| "/cgi-bin/phf" | HTML HREF | 3 |
| ".exe" | TFTP filename | 2 |

FIG. 4

Exemplary Fingerprint Requests and Target Responses

FTP (file transfer):

```
220 rh5.robertgraham.com FTP server (version wu-2.4.2-academ [BETA-15] (1) Sat Nov 1
03:08:32 EST 1997) ready.
```

Telnet

```
Red Hat Linux release 5.0 (Hurricane)
kernel 2.0.31 on an i486
login:
```

SMTP (mail)

```
220 rh5.robertgraham.com ESMTP Sendmail 8.8.7/8.8.7; Mon, 29 Nov 1999  23:28:31-0800
```

Finger (user information)

```
Login Name    Tty   Idle  Login Time    office   office
Phone
rob  Robert David Graham p0 Nov 29 22:51      (gandalf)
root    root                    p1 Nov 29 23:34
(10.17.128.201:0.0)
```

HTTP

```
HTTP/1.0 200 OK
Date:  Tue, 30 Nov 1997 07:34:59  GMT
Server:  Apache/1.2.4
Last-Modified:  Thu, 06 Nov 1997 18:20:06 GMT
Accept-Ranges:  bytes
Content-Length:  1928
Content-Type:  text/html
```

HTTP

```
Date: Fri, 01 Jun 2001 20:38:03 GMT
Server: Apache/1.3.14 (Unix)  (Red-Hat/Linux) mod_ssl/2.7.1 OpenSSL/0.9.5a DAV/1.0.2
PHP/4.0.4pl1 mod_perl/1.24
Last-Modified: Wed, 18 Oct 2000 22:31:33 GMT
ETag: "9327c-b4a-39ee24c5"
Accept-Ranges: bytes
Content-Length: 2890
Connection: close
Content-Type: text/html
```

POP3

```
+OK  POP3  rh5.robertgraham.com  v4.39  server  ready
```

IMAP

```
* OK  rh5.robertgraham.com  IMAP4rev1  v10.190 server ready
```

SMB

```
SMB: ----- Setup Account AndX Header -----
SMB:
SMB: Word count          = 3
SMB: Parameter words     = 750080000000
SMB: Byte Count          = 87
SMB: Byte parameters     = 00570069006E006400....
SMB: AndX command        = 75 (Tree Connect AndX)
SMB: AndX reserved(MBZ) = 00
SMB: AndX offset         = 0080
SMB: Request Mode = 0000
SMB:  .... ....  .... ...0 = Not logged in as 'Guest'
SMB: Byte Count                = 87
SMB: Server's Native OS        = Windows NT 4.0
SMB: Server's Native LAN Man = NT LAN Manager 4.0
SMB: Server's Primary Domain = AMPHLETT
```

FIG. 5

Target Vulnerabilities

| Target Fingerprint | Data Signature (may be context-based) | Severity/Alert Condition (0-5) |
|---|---|---|
| OS: Apache Ver >= 1.2<br>Processor: any<br>BIOS: any | "/cgi-bin/phf" in HTTP Header | 0 |
| OS: Apache Ver < 1.2<br>Processor: any<br>BIOS: any | "/cgi-bin/phf" in HTTP Header | 4 |
| OS: IIS<br>Processor: any<br>BIOS: any | "/cgi-bin/phf" in HTTP Header | 0 |
| OS: Netscape Enterprise Server<br>Processor: any<br>BIOS: any | "/cgi-bin/phf" in HTTP Header | 0 |
| OS: any<br>Processor: Intel<br>BIOS: any | 09090909 | 3 |
| OS: any<br>Processor: Non-Intel<br>BIOS: any | 09090909 | 0 |

FIG. 6

```
 220 mandrake.intra.networkice.com FTP server (Version wu-
2.5.0(1) Sat May 22 11:15:07 GMT 1999) ready.

-> USER rob

   331 Password required for rob.

-> PASS Cerveza2

   230 User rob logged in.

-> SYS RETR /etc/passwd

   500 'SYS RETR /etc/passwd': command not understood.

-> PORT 10,10,0,135,4,1

   200 PORT command successful.

-> RETR /etc/passwd

   150 Opening ASCII mode data connection for /etc/passwd
(2661 bytes).

   226 Transfer complete.

-> RNFR /etc/passwd

   350 File exists, ready for destination name

-> RETR /tmp/etc/passwd

   550 /tmp/etc/passwd: No such file or directory.

-> QUIT

   221-You have transferred 2719 bytes in 1 files.

   221-Total traffic for this session was 3397 bytes in 1
transfers.

   221-Thank you for using the FTP service on
mandrake.intra.networkice.com.

   221 Goodbye.
```

FIG. 8

Excerpt from RFC 959

For each command or command sequence there are three possible outcomes: success (S), failure (F), and error (E). In the state diagrams below we use the symbol B for "begin", and the symbol W for "wait for reply".

```
Snort 1.7 Signature

alert TCP $EXTERNAL any -> $INTERNAL 21 (
     msg: "IDS213/ftp_ftp-passwd-retrieval-retr";
     content: "RETR"; nocase;
     content: "passwd";)


Sample signature using one embodiment of the present
system

alert TCP $EXTERNAL any -> $INTERNAL $FTP (
     msg: "IDS213/ftp_ftp-passwd-retrieval-retr";
     FTP.filename: "*/passwd";
     FTP.banner: "*Version wu-2*";
     FTP.response: "2??";
     FTP.response: "3??";
     )
```

FIG. 10

```
alert TCP $EXTERNAL any -> $INTERNAL $HTTP (
     msg: "system32/cmd.exe";
     HTTP.url: "*/system32/cmd.exe";
     HTTP.server: "IIS/*";
     +HTTP.response: "5??";
     -HTTP.response: "4??";
     -HTTP.response: "2??";
     )

alert TCP $EXTERNAL any -> $INTERNAL $HTTP (
     msg: "IIS malformed HTW";
     HTTP.url.extension: "*.htw";
     HTTP.server: "IIS/*";
     -HTTP.response: "5??";
     -HTTP.response: "4??";
     +HTTP.response: "2??";
     )
```

FIG. 11

RedHat 6.2

| program | vers | proto | port | |
|---|---|---|---|---|
| 100000 | 2 | tcp | 111 | portmapper |
| 100000 | 2 | udp | 111 | portmapper |
| 100021 | 1 | udp | 1024 | nlockmgr |
| 100021 | 3 | udp | 1024 | nlockmgr |
| 100021 | 1 | tcp | 1024 | nlockmgr |
| 100021 | 3 | tcp | 1024 | nlockmgr |
| 100024 | 1 | udp | 980 | status |
| 100024 | 1 | tcp | 982 | status |

RedHat 7.0

| program | vers | proto | port | |
|---|---|---|---|---|
| 100000 | 2 | tcp | 111 | portmapper |
| 100000 | 2 | udp | 111 | portmapper |
| 100021 | 1 | udp | 1024 | nlockmgr |
| 100021 | 3 | udp | 1024 | nlockmgr |
| 100024 | 1 | udp | 1025 | status |
| 100024 | 1 | tcp | 1024 | status |

Solaris 8

| program | vers | proto | port | |
|---|---|---|---|---|
| 100000 | 4 | tcp | 111 | portmapper |
| 100000 | 3 | tcp | 111 | portmapper |
| 100000 | 2 | tcp | 111 | portmapper |
| 100000 | 4 | udp | 111 | portmapper |
| 100000 | 3 | udp | 111 | portmapper |
| 100000 | 2 | udp | 111 | portmapper |
| 100232 | 10 | udp | 32772 | sadmind |
| 100011 | 1 | udp | 32773 | rquotad |
| 100002 | 2 | udp | 32774 | rusersd |
| 100002 | 3 | udp | 32774 | rusersd |
| 100002 | 2 | tcp | 32771 | rusersd |
| 100002 | 3 | tcp | 32771 | rusersd |
| 100012 | 1 | udp | 32775 | sprayd |
| 100008 | 1 | udp | 32776 | walld |
| 100001 | 2 | udp | 32777 | rstatd |
| 100001 | 3 | udp | 32777 | rstatd |
| 100001 | 4 | udp | 32777 | rstatd |
| 100024 | 1 | udp | 32778 | status |
| 100021 | 1 | udp | 4045 | nlockmgr |
| 100021 | 2 | udp | 4045 | nlockmgr |
| 100021 | 3 | udp | 4045 | nlockmgr |
| 100021 | 4 | udp | 4045 | nlockmgr |
| 100024 | 1 | tcp | 32772 | status |
| 100133 | 1 | udp | 32778 | |
| 100133 | 1 | tcp | 32772 | |
| 100083 | 1 | tcp | 32773 | |
| 100221 | 1 | tcp | 32774 | |
| 100235 | 1 | tcp | 32775 | |
| 100021 | 1 | tcp | 4045 | nlockmgr |
| 100021 | 2 | tcp | 4045 | nlockmgr |
| 100021 | 3 | tcp | 4045 | nlockmgr |
| 100021 | 4 | tcp | 4045 | nlockmgr |
| 100068 | 2 | udp | 32779 | |
| 100068 | 3 | udp | 32779 | |
| 100068 | 4 | udp | 32779 | |
| 100068 | 5 | udp | 32779 | |
| 300326 | 4 | tcp | 32776 | |
| 300598 | 1 | udp | 32786 | |
| 300598 | 1 | tcp | 32778 | |
| 805306368 | 1 | udp | 32786 | |
| 805306368 | 1 | tcp | 32778 | |
| 100249 | 1 | udp | 32787 | |
| 100249 | 1 | tcp | 32779 | |
| 1289637086 | 5 | tcp | 32803 | |
| 1289637086 | 1 | tcp | 32803 | |

FIG. 12

SYSTEM AND METHOD FOR PREVENTING NETWORK MISUSE

BACKGROUND OF THE INVENTION

1. Field of the Invention

This invention relates to data network management. More particularly, the invention relates to an improved system and method for analyzing and preventing unauthorized use of data network resources.

2. Description of the Related Art

The rapid increase in the use of data networks by both corporations and private organizations has created a need for improved security and network management techniques. Organizations today store substantial amounts of confidential information on network servers and workstations including trade secrets, marketing strategies, financial documents, and classified technical information. The disclosure of such information to the public would, in most instances, cause severe damage to the organization.

In addition to the danger of confidential information being read out from the network, there is also a danger of unwanted information being written to the network. For example, with a working knowledge of how to evade currently available security systems, computer hackers (i.e., unauthorized users) are capable of crashing network servers and workstations, corrupting valuable data, and uploading computer viruses to the network. As such, organizations are forced to spend millions of dollars each year in an attempt to prevent this type of data network intrusion.

One system for handling a type of network misuse is commonly referred to as a "firewall." Firewalls are generally situated between a local area network (hereinafter "LAN") and all other external networks (e.g., the Internet). The firewall analyzes all incoming and outgoing digital information and makes a decision as to whether the information should be passed through or discarded. The firewall uses one or more algorithms provided by a network administrator to perform this analysis. For example, a network administrator may configure tables listing acceptable source and destination addresses for network traffic. Traffic addressed to an unlisted source or destination will be filtered out and discarded by the firewall.

Firewalls provide insufficient protection against computer hackers for a variety of reasons. One major reason is that firewalls only protect LANs from the outside world whereas the threat posed by computer hackers is not merely external. In fact, the majority of potential computer hackers are internal computer users, most of who already have access to the LAN. Although an individual user will typically be provided only limited access to LAN resources, the user may fraudulently acquire access to additional resources by misappropriating other users' passwords (or using other known computer hacking techniques).

A second problem associated with firewalls is that they are static in nature, requiring continuous updates by network administrators to work properly. If a computer hacker obtains the information necessary to break through the firewall (i.e., information needed to disguise his data as data originating from a legitimate source) he will acquire access to resources on the LAN. Another significant problem with firewalls is that they exclude data in an overly simplistic fashion: data is either passed through or it is discarded. No additional analysis is performed on incoming or outgoing data to determine whether the originator of the data—who may be disguising himself to the firewall—is attempting to misuse resources on the LAN.

A third problem with firewalls is that they do little to protect against abuse of "public" access. A firewall is like a lock on the doors of a convenience store that is open 24-hours a day. The public must be allowed into the store in order to conduct business transactions, the firewall must allow both the public as well as hackers, and can do little to detect or defend against the hackers masquerading as normal members of the public.

One technique used to augment the limited scope of protection provided by firewalls has been referred to as "misuse detection." Misuse detection is the process of monitoring and reporting unauthorized or inappropriate activity on network computers. For example, Smaha et al., U.S. Pat. No. 5,557,742 (hereinafter referred to as "Smaha") discloses a process for detecting a misuse condition by applying predetermined "misuse signatures" to identify known misuses of networked computers. An example of a misuse signature is four unsuccessful logins on a network computer followed by a successful login (see Smaha column 12, lines 12-13).

Several problems exist, however, with respect to prior misuse detection systems. First and foremost, these systems are overly simplistic in the manner in which they evaluate misuse conditions. For example, these systems simply identify misuse signatures transmitted across the network and generate an alert condition in response. They do not factor in relevant information which would allow a more accurate misuse determination such as, for example, the context in which the data signatures are transmitted, the types of nodes to which the data signatures are directed, and/or the responses of the nodes. As such, these systems are incapable of determining the likelihood that the attempted misuse actually succeeded. Intruder scans and attacks are so numerous on networks exposed to the Internet that distinguishing effective attacks from the background "noise" of the Internet has become extremely difficult, if not impossible.

An additional problem with prior art misuse detection systems is that these systems can only identify activity as being suspicious, but cannot conclusively differentiate among deliberate misuse attempts, accidents (e.g., user enters the wrong password), or normal incidents (e.g., network manager uses pings to monitor network performance). Thus, prior art misuse detection systems record all suspicious events and rely upon the intelligence of the operator to wade through the "false-positives" in order to find salient records.

SUMMARY OF THE INVENTION

A system and method for preventing misuse conditions on a data network are described. Embodiments of the system and method evaluate potential network misuse signatures by analyzing variables such as the state of the network and/or target, the context in which the potential misuse signatures are detected, the response/reaction of the target and/or the fingerprint of the target. These and other variables may be factored in to the misuse determination, either alone, or in combination.

BRIEF DESCRIPTION OF THE DRAWINGS

A better understanding of the present invention can be obtained from the following detailed description in conjunction with the following drawings, in which:

FIG. 4 illustrates exemplary types of contextual data which may be used to evaluate data signatures according to embodiments of the system and method described herein.

FIG. 5 illustrates exemplary fingerprint data requests/transmissions and target responses according to embodiments of the system and method described herein.

FIG. 6 illustrates exemplary target fingerprints and corresponding target vulnerabilities employed in one embodiment of the invention.

FIG. 8 illustrates the operation of the FTP protocol.

FIG. 10 illustrates the difference between a signature created according to the existing art compared with a signature created with one embodiment of the present system.

FIG. 11 illustrates the difference between two signatures of the present system, one where a certain response increases the severity of an event, the other that decreases the severity of a different event based upon the same response.

FIG. 12 illustrates portmap dump information employed by embodiments of the invention.

DETAILED DESCRIPTION

A system and method for preventing misuse conditions on a data network are described below. It should be noted that, in the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Network Architecture

Figure 1:
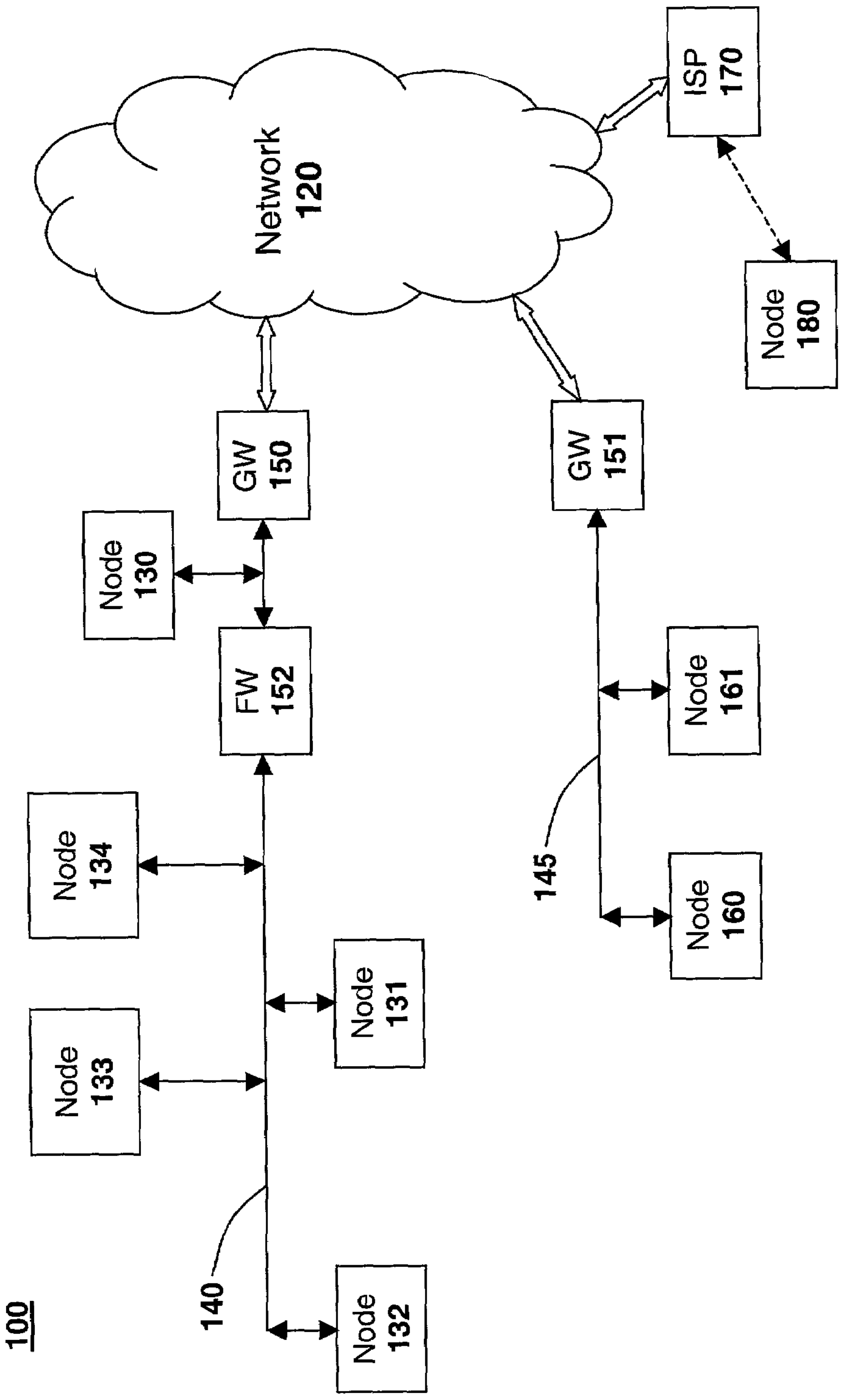
FIG. 1 illustrates an exemplary network architecture on which various features of the system and method are implemented.

Elements of the system and method for preventing network misuse may be included within the network architecture illustrated in FIG. 1. The architecture generally depicts a local area network (hereinafter "LAN") 140 over which a plurality of nodes 130-134 communicate. Nodes 130-134 may be servers, workstations, clients and/or any other types of apparatuses which includes a processor for processing data and a network interface for communicating data across the LAN 140.

The nodes 130-134 communicate over a larger network 120 (e.g., the Internet) through a gateway 150 which, in one embodiment, translates between different network protocols of the LAN 140 and the larger network 120 as required. Also included on the LAN 140 is a firewall 152 used to filter out unwanted data from the portion of the LAN 140 on which a group of the nodes (i.e., nodes 131-134) reside.

A second LAN 145 and a group of nodes 160, 161 are also illustrated communicating over the larger network 120 through a second gateway 151. In addition, a node 180 is illustrated communicating over the network 120 by connecting through an Internet Service Provider 150 (hereinafter "ISP"). The node 180 may communicate with the ISP 170 using a variety of different communication channels including, for example, a standard telephone channel, a digital subscriber line ("DSL") channel, or a cable modem channel.

Embodiments of the invention include various steps, which are described below. The steps may be embodied in machine-executable instructions which can be used to cause a general-purpose or special-purpose processor on one or more of the nodes 130-134 to perform certain steps. Alternatively, these steps may be performed by specific hardware components that contain hardwired logic for performing the steps, or by any combination of software, firmware and/or hardware.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

EMBODIMENTS OF THE INVENTION

As used herein, an "incident" or an "event" is the receipt of a suspicious data transmission by a network node hereinafter referred to as the "target node" or "target," originating from another network node, hereinafter referred to as the "suspect node" or "suspect." Certain types of incidents are inherently suspicious from a system security point of view. For example, the pattern "/cgi-bin/phf" directed to a target server may indicate that a hacker is trying to exploit the "phf" Common Gateway Interface ("CGI") script in order to break into the server (the "phf" script was included as a demonstration program with certain server operating systems). Similarly, several successive transmissions of an invalid user ID or password from a suspect node to a target may indicate that an unauthorized user is attempting to gain access to the target. Various other types of suspicious network events are described below.

In one embodiment of the invention, one or more of the nodes—e.g., node 132—monitors network traffic across the LAN 140. When the node 132 identifies an incident directed to a particular client or server—e.g., node 134—it may (or may not) log the incident, generate an alert condition and/or take certain precautionary measures. The type and extent of action taken by the node 132 may depend on a variety of factors including, but not limited to, the type of incident detected; the "type" of target to which the incident is directed (e.g., the processor in the target, version of software running in the target, . . . etc); the response of the target; the firewall response, if any (e.g., whether the incident has been filtered by the firewall), and/or the behavior of the target following the incident. Each of these variables, alone or in combination, may dictate the type and extent of a response.

Other embodiments may consist of software running on the target itself, either within the networking stack or within the process space of the target service.

State-Based Protocol Analysis

As described above, prior misuse detection systems listen for "suspicious" data patterns broadcast across the LAN. One embodiment of the present system will instead fully "decode" network traffic.

Figure 9:
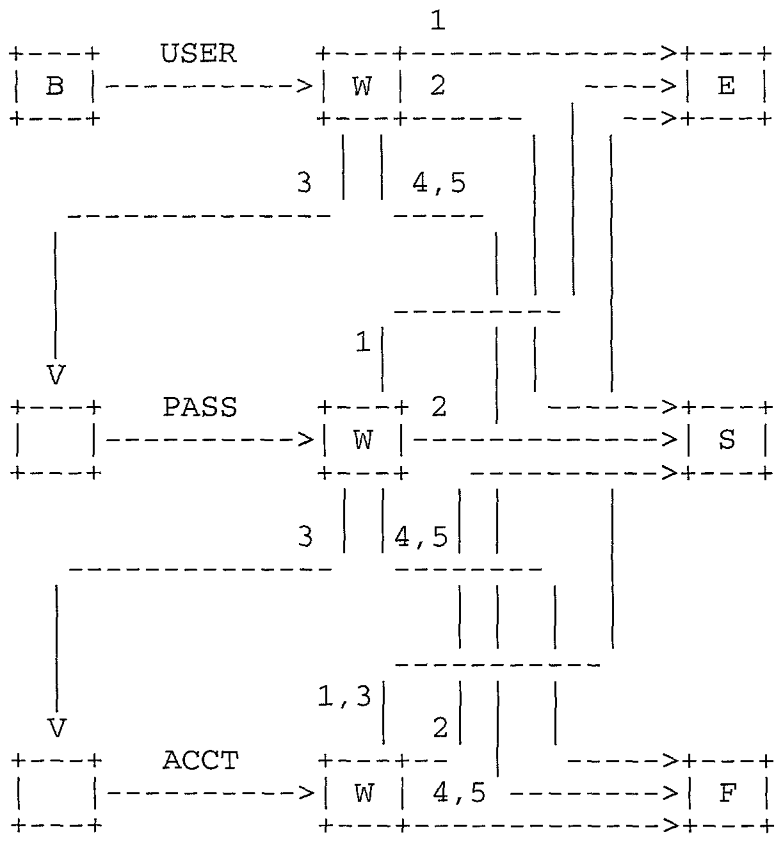
FIG. 9 illustrates part of the state-diagram for the FTP protocol; this is an excerpt from the FTP specification "RFC 959".

Network services are often described through the use of a state machine. For example, before interacting with a service, a user must first login. Described another way, many services start in the "authentication" state before transitioning to the "command" state. An example of state-diagrams for the FTP service can be found in RFC959. See FIG. 9 for an example of the portion of the FTP state-machine responsible for logging on and authenticating.

The prior art of misuse detection systems are generally "stateless." They ignore the state of protocol machine, but instead look for simple patterns or strings. By contrast, embodiments of the invention described herein contain knowledge of the state machine.

FIG. 8 demonstrates the FTP command channel, showing the user requests (prefixed by →) and the server responses. Each request and response has been sent via a different packet across the network. One embodiment of this invention describes a misuse detection system that tracks the state of this protocol machine. Rather than examining each packet blindly for well-known strings, the embodiment tracks both the client and server side remembering what each does.

FIG. 10 shows the difference between a signature written according to the state-of-the-art, and a signature written according to one embodiment of the present invention. Both signatures correctly trigger on the "RETR /etc/passwd" command. However, the first signature simply looks for the patterns "RETR" and "passwd" within a command. As such, this signature will falsely trigger in the FTP session demonstrated in FIG. 8 with the "SYST" command. This signature will not correctly trigger when presented the "RNFR" command.

In contrast, the new signature provides enhanced capability. It looks for the filename "passwd" only within contexts where filenames are likely to appear. It will not trigger on the "SYST" command, because it knows that FTP does not process filenames within that command. It will also correctly trigger on the "RNFR" command, because it knows that filenames appear within that command.

Furthermore, the signature has been programmed to only trigger when the server responds indicating success (in FTP, the command codes between 200 and 399 indicate success). Therefore, the signature will not trigger on the "RETR /tmp/etc/passwd", because it knows that the command failed with a response of 550.

Finally, this signature focuses in on the Washington University variant of FTP servers. It is a popular FTP service included with many popular UNIX systems, and is known to be frequently configured to allow access to the password file. This sample signature using the present system has been programmed to only trigger an alert when this FTP service has been discovered.

Contextual Data Signature Analysis

As described above, prior misuse detection systems listen for "suspicious" data patterns broadcast across the LAN. One embodiment of the present system and method also monitors network traffic for suspicious data signatures. However, referring to FIG. 2, upon detecting a suspicious data signature transmitted from a suspect to a target (at 205), one embodiment of the system also evaluates the context in which the signature is transmitted (at 210). As used herein, a data signature's context includes information related to how the data signature is transmitted such as, for example, the underlying protocol used to transmit the data signature and/or the data field in which the data signature is encapsulated. The system uses contextual information of this sort to evaluate the extent to which the detected data signature poses a threat to the target.

For example, the data signature of a path directed to "/cgi-bin/phf" may indicate that someone is attempting to exploit a particular server by running the "phf" script/program stored on that server. This is a particular concern if the path is embedded in the header of a HyperText Transport Protocol ("HTTP") data transmission (indicating that someone is actually attempting to execute the "phf" program). Accordingly, one embodiment of the system will generate an alert condition only if the path is detected in this context (or will generate a relatively more severe alert condition). By contrast, if the same path is embedded in the header of an email or news message, then it is unlikely that the transmission poses a threat (i.e., because in these contexts the transmission will not execute the "phf" program).

A variety of additional contextual information which may be used to evaluate data signatures is set forth in FIG. 4. It should be noted, however, that the information tabulated in FIG. 4 is merely exemplary and should not be read to limit the underlying principles of the invention.

Figure 2:
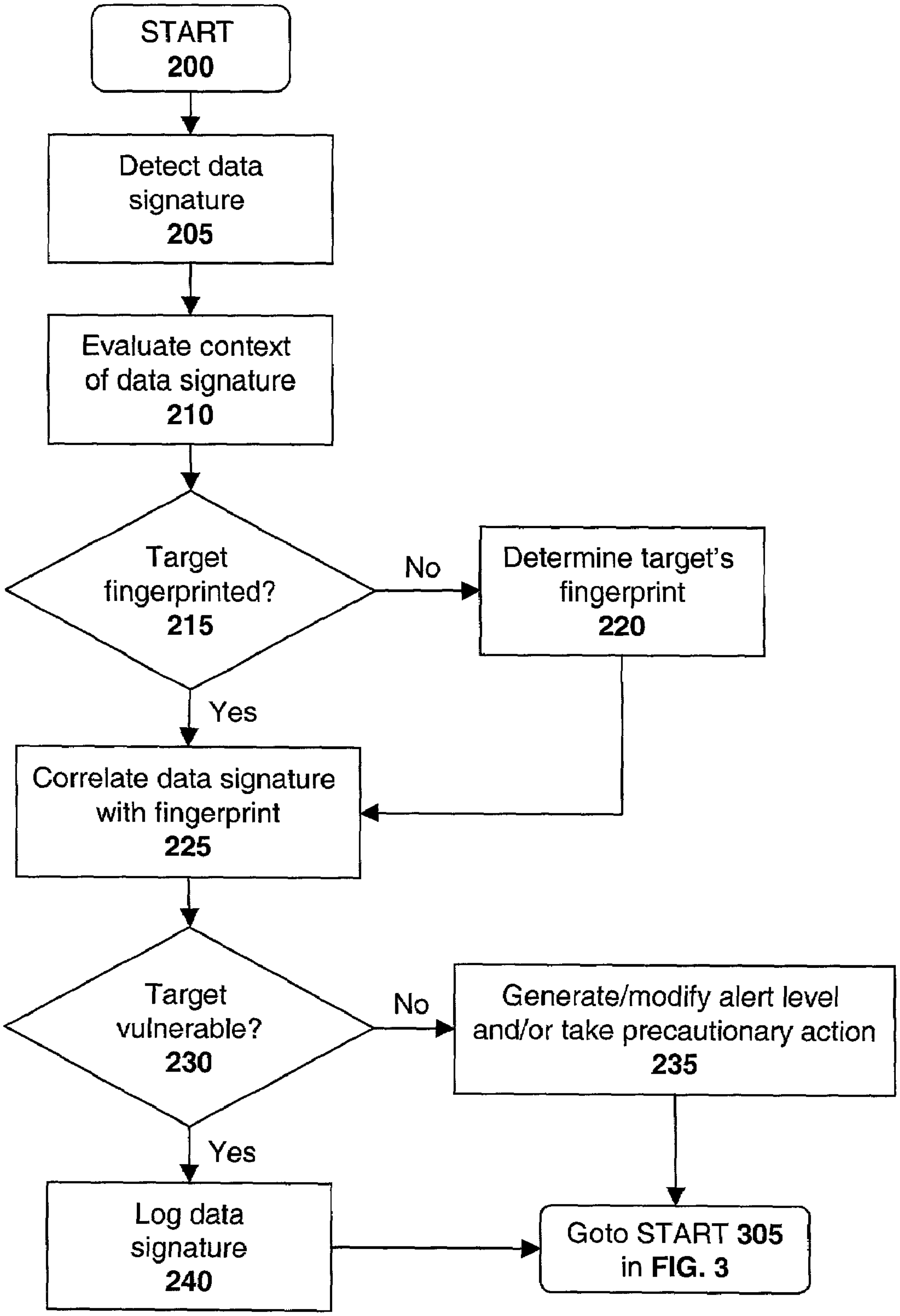
FIG. 2 illustrates embodiments of a process for analyzing and preventing data network misuse.

In addition, although illustrated in FIG. 2 as two independent steps, 205 and 210, one embodiment of the invention simultaneously detects suspicious data signatures and determines the context of the signatures (e.g., via a lookup table which includes both signature and contextual data). In other words, in this embodiment the contextual data may be incorporated into the definition of the "data signature" itself.

Service Fingerprint Analysis

One embodiment of the invention also factors in the "fingerprint" of the target when performing misuse analysis. As used herein a target's "fingerprint" includes the operating system ("OS") and/or the OS version configured on the target; any applications or services running on the target; the basic input/output system ("BIOS") and/or the BIOS version; the processor(s) configured on the target; and/or any other information relating to the software/hardware and/or firmware configured on the target.

This "fingerprint" data may be collected by various embodiments of the system in various ways. In one embodiment, fingerprint data for all (or a select group of) potential targets is manually input by a system operator (e.g., the network administrator). Alternatively, or in addition, one embodiment automatically scans potential targets over the network to acquire relevant fingerprint data (e.g., on a periodic basis and/or upon detecting a suspicious data signature). Alternatively, or in addition, one embodiment passively monitors the behavior of the system (e.g. extracting version information from the banner). Regardless of how the target fingerprint data is collected, the underlying principles of the invention remain the same.

Exemplary fingerprint data requests/transmissions and target responses are illustrated in FIG. 5. In addition to these explicit requests/responses, implicit information about the target may also be collected based on the target's behavior. For example, the nmap port scanning program can determine the target's OS by sending specially constructed packets at the target. While all OSes respond the same to legal input, OSes respond differently to illegal input, allowing nmap to uniquely identify the target OS. A host-based scanner may be employed to query the versions of running services/applications, then upload the database to the IDS. Various additional mechanisms may be employed for collecting target fingerprint data while still complying with the underlying principles of the invention.

The fingerprint not only include simple versioning information, but also information about the features that might be enabled within the target service. FIG. 5 shows an Appache version 1.3.14 server that runs on RedHat Linux, with the mod_ssl version 2.7.1 extension based upon the OpenSSL version 0.9.5a libraries. It also supports a DAV module version 1.0.2 and scripting interface for PHP and PERL (with respective module version numbers). FIG. 12 shows portmap dump information, indicating which versions of software modules are running, as well as allowing a fingerprint of the entire system to be determined.

Regardless of how/when the target fingerprint data is collected (determined at 215 and/or 220 of FIG. 2) one embodiment of the system correlates the fingerprint data with the context-based and/or state-based data signature (as indicated at 255) to determine whether the target is actually vulnerable to the suspicious data signature (at 230). For example, only certain target configurations are vulnerable to the "phf" data signature described above. More specifically, the Apache™ server with a version number below 1.2 is vulnerable to the "phf" attack. Thus, if the target fingerprint indicates Apache version of 1.2.4, then the system may only generate a low-level alert (or no alert) upon detecting the "phf" signature. If, however, the target is running version 1.0 of Apache, then the target is vulnerable and the system may generate a more severe alert condition.

Similarly, the signature "09090909 . . . " is considered a suspicious signature because it represents code used to execute "no-ops" on an Intel™ processor (e.g., a Pentium™-class processor). Although "no-ops" have certain legitimate uses for software developers, they may also be used by intruders to break into and/or disable Intel-based systems under certain circumstances. As such, if the target contains an Intel processor and a "no-op" data signature is identified, then an alert condition may be generated because the target is vulnerable to the "no-op" attack. However, if the target is configured with a non-Intel processor (e.g., a Sun Sparc™ processor), then the target is not vulnerable, and the system may (or may not) merely log the event. One example where the system discovers that the target is using an Intel process is from the Telnet banner shown in FIG. 5.

Certain target fingerprints and corresponding vulnerabilities are set forth in FIG. 6. However, it should be noted that the table in FIG. 6 is not an exhaustive list and is used for the purpose of illustration only. One embodiment of the system maintains a table such as the one in FIG. 6 in memory and references the table to determine whether particular targets are vulnerable to particular data signatures. In this embodiment, the table may be continually updated as new vulnerabilities (or lack thereof) become known. The table may include a list of targets which are vulnerable to particular data signatures, targets which are not vulnerable to particular data signatures, or both, depending on the embodiment of the system.

If the system determines that the target is not vulnerable, one embodiment of the system generates a low-level alert and/or simply logs the event signature (or may take no action whatsoever, depending on the configuration). If the system determines that the target is vulnerable, however, then one embodiment will generate an alert condition (or increase a preexisting alert level) and/or may take certain precautionary measures (at 235). For example, at this stage the system may attempt to block incoming data transmissions from the suspect node (e.g., by commanding the firewall to do so).

Target Response Analysis

Figure 3:
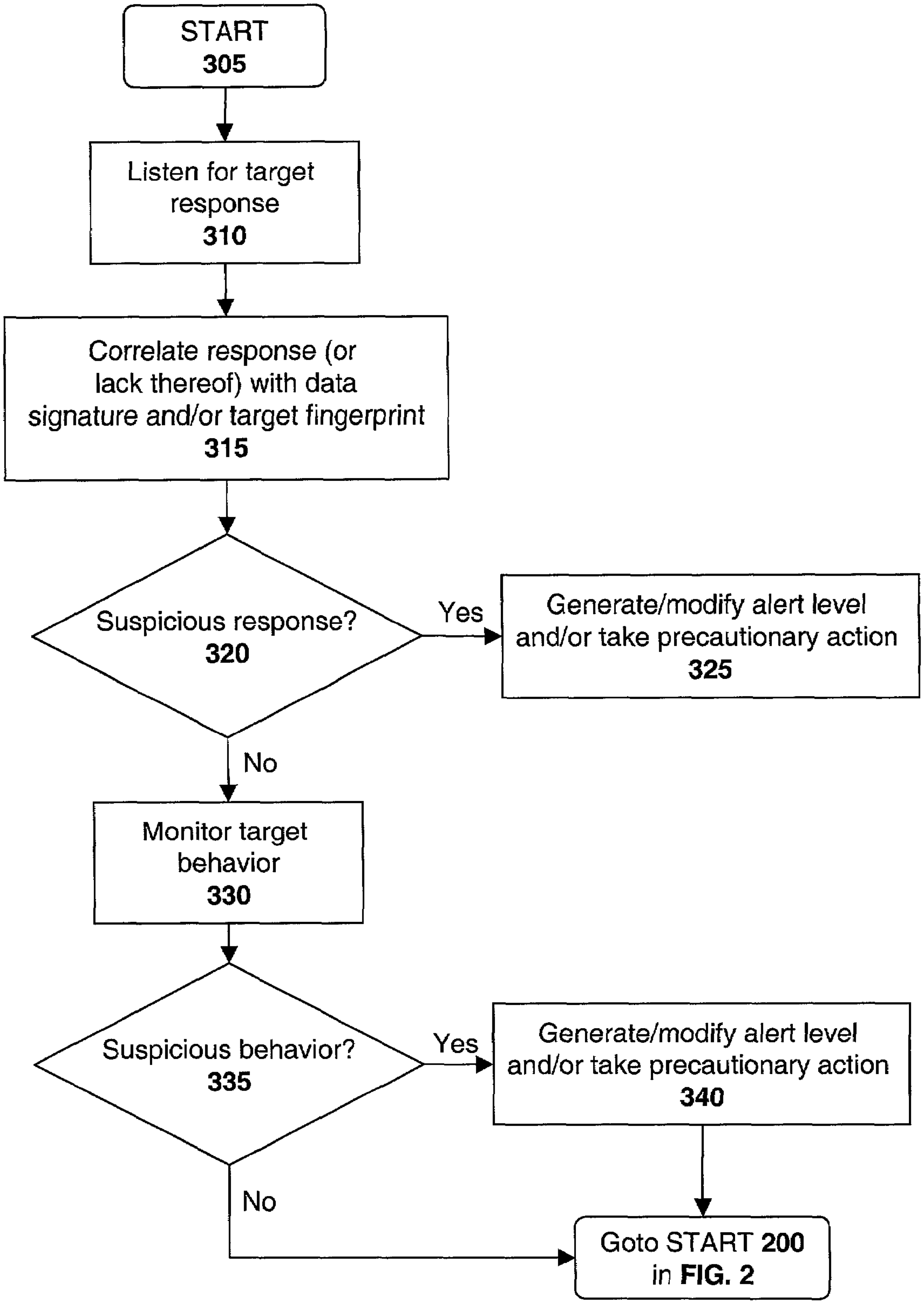
FIG. 3 illustrates additional embodiments of a process for analyzing and preventing data network misuse.

One embodiment of the system factors in the target's response to the detected data signature to further evaluate the probability of network misuse. Thus, referring to FIG. 3, after hearing a suspicious data signature, this embodiment of the system listens for a response from the target at 310. At 315 the system correlates the response with the detected data signature and/or the target fingerprint. If the system determines that the target's response is "suspicious" (at 320) then it may generate/modify an alert level and/or take certain precautionary measures as described above. If the system was already in a state of heightened alert (e.g., based on the data signature and target fingerprint analysis described above) then it may jump to a relatively higher state of alert.

Various types of target responses may be identified as "suspicious." For example, if a request is directed to the target but no response is detected, this may indicate that the target has been disabled due to a Denial-of-Service attack (DoS). Similarly, a connection to the target being closed without a target response and/or the target response being significantly delayed may also indicate that an attack has been made on the target. Non-protocol responses from the target after the attack may indicate that the connection has been transformed from the protocol (such as FTP) into a raw shell (similar to Telnet).

One embodiment of the system allows responses to be coded along with the signature. FIG. 11 illustrates two signatures provided to the system. In the first signature, if the file "system32/cmd.exe" is accessed, a response value of "200" indicates that the attack failed—the example shows that the attack is downgraded (using the minus symbol) if that response code is detected. However, the second signature detects an HTW attack. In this case, a response code of "200" indicates that the attack succeeded (specified using the plus symbol).

The response will appear on the network a long time after the initial request that first triggered the signature. One embodiment will wait until it receives a response (or times out) before generating the alert. Another embodiment will generate an alert immediately upon the initial trigger, then update that alert based upon the additional information as it arrives.

In addition, one embodiment of the system may trigger an alert if a target transmits a response which should never occur during normal protocol operation. One example is the non-protocol response described above. In addition, during a File Transfer Protocol ("FTP") session, if an FTP target generates an "unknown command" response, one embodiment of the system will generate an alert condition because the "unknown command" should never be transmitted by the target during normal operation. In other words, commercially available FTP applications will generally send decipherable FTP commands to the target. If an unknown command is sent, this may indicate that someone is entering FTP commands at a command prompt in an attempt to compromise the target. Rather than triggering on the raw pattern of "unknown command", the embodiment will trigger upon the state indicating that the command was unknown: the alert will include the information as to which command was unknown that was remembered from the request.

One embodiment of the invention will not simply evaluate the target's response alone but, rather, will evaluate the target's response in light of the data signature sent to the target. For example, one type of suspicious data signature is referred to as a "buffer overflow" attack/signature. A target which permits user logins will typically allocate a predetermined amount of memory for a user name and/or password to be transmitted from the user (e.g., a data field of 100 characters in length). Computer hackers may attempt to exploit a target by transmitting executable code to the target in response to the user ID and/or password. The computer hacker may attach the executable code to the data transmission such that it resides outside of the allocated data field (resulting in the "buffer overflow" condition). Once inside the target, the executable code will then execute in an undefined space in memory (i.e., outside of the pre-allocated memory space) where it can perform a variety of harmful transactions including crashing the target. Thus, in one embodiment of the system, if a buffer overflow condition is detected (i.e., more data is transmitted to the target in response to the user ID prompt than is allocated) then the system may generate a first alert condition and/or monitor the target's response. If the target's response is delayed or if the target does not respond, then this is a strong indication that the target has been compromised and the system may generate a heightened alert condition. Various other target responses may be correlated with various known data signatures to determine whether, and to what extent, the target has been compromised.

Subsequent Target Behavior Analysis

Referring once again to FIG. 3, one embodiment of the system will continue to monitor target behavior (at 330) regardless of whether the target's initial response was suspicious (determined at 320). Various types of target behaviors are considered "suspicious," particularly when preceded by a suspicious incoming data signature. More particularly, if a target transmits certain types of character strings to a suspect node, this may indicate that the suspect has gained access to restricted areas of the target.

In addition to the examples set forth above, a root shell prompt, such as the character "#" for UNIX systems, indicates that a user at the suspect node has gained full access to system resources and therefore has the ability to add/delete virtually anything from the target's hard drive (a normal prompt in UNIX is identified by a different character such as "$" or "%"). When one embodiment of the system detects the root shell transmitted to a suspect node under normal conditions, it may not immediately generate an alert condition (e.g., it may simply log the event), because the user at the target may legitimately have authority to use the root shell prompt (e.g., a network administrator). If, however, the system detects or has previously detected a suspicious condition related to the suspect or the target (e.g., the "buffer overflow" data signature from the suspect followed by a long delay from the target) then the system may generate an alert condition and/or may take certain precautionary measures (at 340).

Numerous other suspicious target behaviors exist including, for example, a transmission of the Windows™/DOS™ command prompt to a suspect and/or transmitting known root-kit protocols used by computer hackers such as LOKI, TFN and/or Trin000, all of which may indicate that a hacker is attempting to gain unauthorized access to the target. The string "command not found" indicates the potentially suspicious event that somebody attempted an action that was denied, but since users mistype commands so frequently it is never logged. However, if the system has been placed into heightened awareness because of a buffer-overflow was detected, this might indicate that the intruder has successfully obtained a command shell to the system and is exploring the system.

Specific Protocol Examples

Many Internet protocols are based upon a text-based system. Each command is specified on a single line, then a line comes back with the response. Responses come back as lines of text. A command is of the form "CMD parameters," where "CMD" is a short string indicative of the command, and the parameters are additional information for that command. A response line contains a 3-digit numeric code, where the first digit ranges from 1-5, where 1=preliminary, 2=success, 3=intermediate, 4=failure, 5=major-failure. The additional content on the response line is usually intended only for human readable purposes, though sometimes it has machine parseable content.

Example from some protocols are:

NNTP—Network News Transport Protocol

→ARTICLE 401
423 No such article in this newsgroup

The client attempts to retrieve article numbered 401, but is denied because it doesn't exist.

POP3—Post Office Protocol version 3

→DELE 1
+OK message 1 deleted

User deletes message number 1 successfully (POP3 diverges because it does not have numeric response codes).

SMTP—Simple Mail Transfer Protocol

→RCPT TO:<patent@robertgraham.com>
250<patent@robertgraham.com> . . . Recipient ok The client tells the e-mail server where the e-mail is destined. The server respond back saying that the address is acceptable.

FTP—File Transfer Protocol

→PASV
227 Entering Passive Mode. 192,168,1,202,4,1

The client tells the FTP server to prepare for receiving a file, the server responds with an indication that the file should be send to it on port 1025.

These protocols can be modeled with a common signature system, whereby a signature is specified to include:

<protocol> <command-name> <pattern> <[+/−] response-code> <[+/−] behavior> <[+/−] fingerprint> <reaction>

A signature doesn't have to have all these components, but one which includes everything might look like:

FTP.PASV "*192,168,1,201*"+"2??"+slow−"*Microsoft*" log>3

The above signature would tell the FTP parser to examine FTP traffic for the PASV command. When it sees the regular-expression, it should trigger an alert. The alert's severity should be raised if the response code is of the 200-class and if the connections seem slow to respond. However, the severity should be downgraded if it is a Microsoft FTP service. If the severity exceeds a threshold of 3, then the action should be to log all further traffic across the connections between the machines for a period of time.

Protocols based upon the Sun RPC (Remote Procedure Call) system might have a different style of signatures specified. In order to specify a unique operation, a unique program number, version number, and procedure call must be specified. The content of RPC data is highly structured according to XDR (External Data Representation) rules. Therefore, rather than a simple pattern or regular expression, the signature can specify context for the signature according to XDR guidelines. Response codes can vary from underlying transport events (e.g., connection terminated), to RPC events (e.g., unknown procedure number), to high-level XDR encoded events dependent upon the exact signature.

There is a vulnerability within the rpc.ypasswd subsystem on certain systems whereby a long username could be specified on a password "update." The update structure looks like the following:

```
struct yppasswd {
    string oldpass<>;
    string pw_name<>;
    string pw_passwd<>;
    int pw_uid;
    int pw_gid;
    string pw_gecos<>;
    string pw_dir<>;
    string pw_shell<>;
};
```

FTP.PASV "*192,168,1,201*"+"2??"+slow−"Microsoft*" log>3

RPC. 100009.1.1 [S[ ]S[len>213]S[ ] I[ ] I[ ] S[ ] S[ ] S[ ]]−RPC=0/−PROG=I[ ]−NOPROG/+SPARC/+Solaris/−Linux/−FreeBSD This signature is interpreted as:

Evaluate with signature within the context of RPC, program=100009 (YPPASSWD), version=1, procedure=1 (UPDATE)

Read in the input, which is of the form of three XDR strings, two integers, and three more strings.

Trigger when the second string, the pw_name field, is longer than 213-bytes.

We expect the service to crash at this point, so if we get back a legal RPC response saying the command was sent, or a legal YPPASSWD response containing a single XDR integer field (the "status" field), then we know the attack failed. We should therefore reduce the severity of the alert.

Typical exploits in the real world affect Sun Solaris machines running on SPARC CPUs. Therefore, if the background fingerprint information indicates these conditions, then we should raise the severity of the alert. We also know of some broken scripts used by hackers against Linux and FreeBSD machines, so if YPPASSWD services are attacked on these machines, then we should lower the severity of the alert. The "NOPROG" code is described below.

Note that in the above signature it is assumed that the fingerprinting information comes from the RPC subsystem. One mechanism is to execute a portmap dump listing all the services. For example, FIG. 12 contains three tables showing the portmap dump output for RedHat 6.2 Linux, RedHat 7.0 Linux, and Solaris 8. The values are typical of each of these system versions. A portmap dump of a new system will likely contain the same versions of software as a system showing a similar dump.

Also note that the RPC fingerprinting process discovers the likelihood that the service is running at all. As you can see in these portmap dump examples, the yppasswd daemon hasn't been registered is unlikely to be running. This means that if the "NOPROG" code is specified as part of the fingerprint rule, then attacks against non-existent services can have their severities downgraded.

It should be noted that the foregoing examples of system operation were for the purpose of illustration only. The contextual, state-based signature analysis and platform fingerprinting just described may be employed using various other protocols and platforms while still complying with the underlying principles of the invention.

Firewall Analysis

One embodiment of the system and method will also evaluate whether a firewall is configured to block certain suspicious data signatures before raising an alert and/or taking action in response to those signatures. For example, referring again to FIG. 1, node 130 may be configured to scan for suspicious network traffic (as described above) and may work with the firewall 152 to filter out suspicious data. If node 130 knows that firewall 152 is already configured to screen out "phf" data signatures (described above), for example, then node 130 may not even generate an alert condition upon sensing a "phf" signature.

Alternatively, of in addition, node 130 may communicate with and/or control firewall 152. In this embodiment, once a particular alert threshold has been reached (e.g., there is a high probability that a suspect has gained unauthorized access to the system), node 130 may control the firewall 152 to filter out those data signatures causing the heightened alert threshold.

Although illustrated in FIG. 1 as separate devices, in one embodiment, node 130 (or other node(s) on which elements of the system are implemented) and firewall 152 are comprised of a single device (i.e., a computer) which performs the functions of both (e.g., detecting data signatures, raising alert levels, blocking certain traffic . . . etc). In addition, one embodiment of the system is incorporated on all, or a select group of, nodes throughout the LAN 140. For example, one embodiment may be installed and executed on all servers and/or workstations on the LAN 140 to monitor all incoming and outgoing workstation/server traffic.

State-Based Detection and Prevention

Any of the foregoing variables—data signature, data signature context, target fingerprint, target response, target behavior and/or firewall response—alone or in combination may be evaluated by embodiments of the invention to modify an alert level. Thus, the alert level of one embodiment is a stateful value which may be driven up or down as new information is acquired with respect to the foregoing variables or other system variables. Moreover the alert level may be a network-wide alert level, a target-specific alert level and/or a suspect-specific alert level.

Embodiments of the invention may also employ features disclosed in the co-pending application entitled "A Method and Apparatus for Providing Network and Computer System Security" (Ser. No. 09/477,500, filed Nov. 23, 1999), which is assigned to the assignee of the present application and which is incorporated herein by reference. The foregoing application discloses a system and method in which a particular type of stateful alert level, referred to as an "aggravation level," is modified based on suspicious network activity. Thus, a target's aggravation level may initially increase upon detecting a suspicious data signature transmitted from a suspect (e.g., based on signature and/or signature context as described above); it may increase further if, based on an analysis of the target's fingerprint, the target is vulnerable to the data signature; finally, it may rise even higher if the target's response or other subsequent behavior is "suspicious" in some way.

Figure 7:
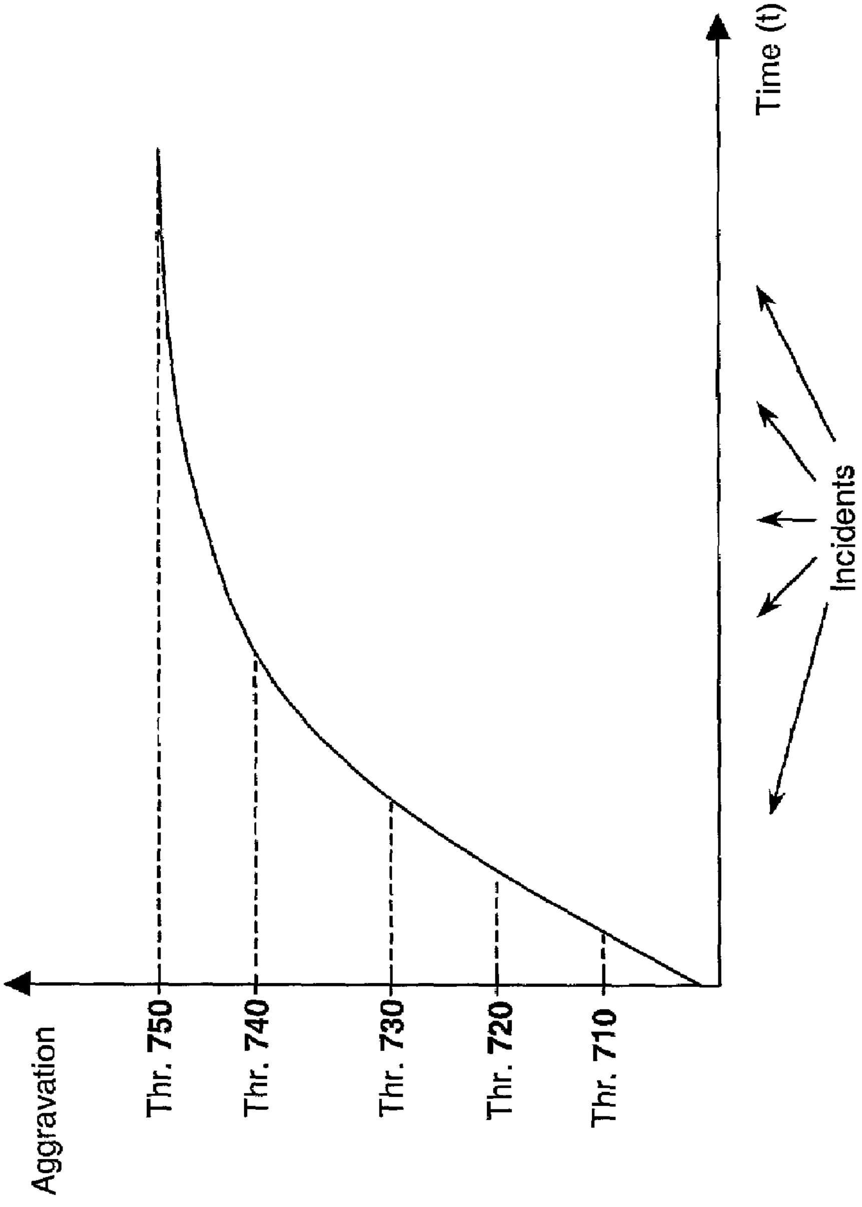
FIG. 7 illustrates the relationship between an aggravation level and a series of incidents according to one embodiment of the invention.

As the aggravation level of the target increases in this manner, it may pass through thresholds triggering various system responses, including passive scanning of the suspect, active scanning of the suspect, and/or blocking incoming data transmitted from the suspect. More specifically, one particular embodiment will now be described with respect to FIG. 7. As the aggravation level increases, as shown in curve 710, a first aggravation threshold reached is threshold 710. In one embodiment, at threshold 710 the target begins a passive scan on all incoming incidents. For example, the target may begin recording concurrent incoming incidents in an incident log file so that the full extent of the intrusion can be identified. Examples of incidents include web server "hits" (file access), mail commands, port scans, and pings from the suspect(s) to the target.

At the next aggravation threshold, threshold 720, the target of one embodiment will begin actively scanning the suspect nodes causing the incidents, in an attempt to acquire identification information about the suspect nodes. One example of an active scan is the "finger" command. The finger command returns, among other information, the suspect nodes' network addresses and the identity of the users who are currently logged in to the suspect nodes. At this aggravation threshold, the target may also increase its passive scanning for new incidents. Thus, at aggravation threshold 720, the target may begin to actively acquire information about the suspects and also may increase the logging associated with new incidents.

As the target continues to receive suspicious data signatures from one or more suspects (e.g., invalid logins), and/or correlates the suspicious data signatures with additional information (e.g., the target's fingerprint, the target's response . . . etc) its aggravation level reaches threshold 730. Here, the target of one embodiment begins a more aggressive active scan of the suspects. For example, using the "traceroute" command the target may attempt to ascertain the complete network route taken by data originating form the suspect. In addition, the target may query the suspect's local gateway for the suspect's data link address (a.k.a. media access control address) using the Simple Network Management Protocol ("SNMP"). More specifically, identification via SNMP can consist of a "get-next" sweep of the table of the if Entry field (usually, one entry per interface).

As the target's aggravation reaches threshold 440, the target in one embodiment will take additional steps to ensure that an unauthorized suspect is not provided with access to its resources. At this threshold the target may require additional authentication information from suspects before providing the suspects with access. For example, even if a suspect transmits correct login information (i.e. the correct user ID and password) to the target, the target may initially return an "invalid login" response back to the suspect. Only if the suspect once again transmits the correct login information will the target provide the suspect access. By forcing a double logon in this manner, the target will prevent suspects from acquiring unauthorized access by using automated login scripts, i.e., scripts which run through a series of user ID's and/or passwords in an attempt to determine a valid combination.

At its highest aggravation threshold of this embodiment, threshold 750, the target has received numerous suspicious signatures and/or has correlated the signatures with a variety of network/target information to determine that there is an unreasonably high probability that an unauthorized suspect may gain access to its resources. Therefore, at this aggravation level the target may take the final step of blocking incoming incidents (e.g., from every one, from everyone outside its LAN, from a given set of suspects, etc.), thereby denying access to its resources. The target may also decide to take active scanning measures beyond simple identification, such sending a "ping-of-death" in an attempt to shut down the suspect(s).

In addition to maintaining an aggravation level for each individual target on the network, an aggravation level may also be maintained for the entire network ("network aggravation level"). The network aggravation level may be calculated by simply averaging the individual target aggravation levels. Alternatively, it may bear some other mathematical relationship with the target aggravation levels. In addition, in one embodiment each target maintains a unique aggravation level for each suspect node with which it communicates ("suspect-specific aggravation"). It should be noted that various types of defined aggravation levels may be employed without departing from the underlying principles of the invention.

Throughout the foregoing description, for the purposes of explanation, numerous specific details were set forth in order to provide a thorough understanding of the invention. For example, the "phf" data signature was described in detail to illustrate particular embodiments of the system and method. It will be apparent, however, to one skilled in the art that the invention may be practiced without some of these specific details. Various well known and yet unknown data signatures, data signature contexts, fingerprint data, and target responses may be used within the system and method described herein. Accordingly, the scope and spirit of the invention should be judged in terms of the claims which follow.

What is claimed is:

1. A computer-implemented method comprising:

identifying a plurality of data signatures relevant to computer security;

designating an alert condition value to each data signature based on each data signature itself and contextual information associated with the data signature, each alert condition value comprising a ranked value that is unique to each combination of data signature and contextual information associated with a particular data signature, the contextual information comprising at least one of an application layer data field type used to encapsulate the data signature and an application layer protocol type used to transmit the data signature, the alert condition value indicating a security risk level relative to different data signatures and relative to other identical data signatures associated with different contextual information;

creating a table comprising the contextual information, the data signatures, and the alert condition values;

detecting a data signature by evaluating communications at an application layer level between a target and a suspect;

correlating said data signature with an application layer fingerprint of the target to determine to what extent said target is vulnerable to said data signature;

evaluating contextual information related to the data signature by comparing the contextual information and the data signature to the table in order to determine a likelihood that said target is under attack; and assigning an alert condition value to the data signature based on the comparison of the contextual information and data signature to data in the table.

2. The method as in claim 1 wherein said fingerprint includes said target node's operating system version.

3. The method as in claim 1 wherein said fingerprint includes said target node's processor type.

4. The method as in claim 1 further comprising:

generating a first alert condition upon determining that said target node is vulnerable to said data signature.

5. The method as in claim 1 further comprising:

listening for a response to said data signature from said target.

6. The method as in claim 5 further comprising:

determining whether said target node's response or lack of a response is suspicious.

7. The method as in claim 6 wherein determining whether said target's response is suspicious comprises determining whether said target's response is an "unknown command" response.

8. The method as in claim 6 further comprising:

generating a second alert condition upon determining that said target node's response or lack of a response is suspicious.

9. The method as in claim 8 further comprising:

combining the second alert with the first, thereby updating the first alert with information within the second alert.

10. The method as in claim 9 wherein said target node's suspicious behavior comprises transmitting a root shell prompt to a suspect node.

11. The method as in claim 1 further comprising:

listening for behavior of said target node; and generating a second alert condition upon determining that said target node's behavior is suspicious.

12. A computer-implemented method comprising:

identifying a plurality of data signatures relevant to computer security;

designating an alert condition value to each data signature based on each data signature itself and contextual information associated with the data signature, each alert condition value comprising a ranked value that is unique to each combination of data signature and contextual information associated with a particular data signature, the contextual information comprising at least one of an application layer data field type used to encapsulate the data signature and an application layer protocol type used to transmit the data signature, the alert condition value indicating a security risk level relative to different data signatures and relative to other identical data signatures associated with different contextual information;

creating a table comprising the data signatures, contextual information, and alert condition values;

identifying a data signature encapsulated in an application layer data field and directed at a target using an application layer protocol;

evaluating a context of the data signature by one of:

reviewing the application layer data field type;

reviewing the application layer protocol type;

comparing the evaluated context of the data signature to the table;

determining whether said data signature poses a threat based on said context of said data signature; and assigning an alert condition value to the data signature based on the comparison of the context to data in the table.

13. The method as in claim 12 wherein said protocol is the HyperText Transport Protocol ("HTTP").

14. The method as in claim 13 further comprising:

determining that said data signature poses a threat if said data signature is "/cgi-bin/phl" embedded in the header of said HTTP data transmission.

15. The method as in claim 12 further comprising evaluating whether said data signature poses a threat based on a fingerprint of said target.

16. The method as in claim 15 wherein said fingerprint is comprised of a particular service executed on said target.

17. The method as in claim 15 wherein said fingerprint is comprised of a particular operating system executed on said target.

18. The method as in claim 15 wherein said fingerprint is comprised of a particular hardware platform of said target.

19. The method as in claim 12 further comprising:

monitoring responses from said target following said data signature; and determining a likelihood of whether said target is under attack based on data signatures of said responses.

20. The method as in claim 19 wherein said target response is a non-protocol response.

21. The method as in claim 20 wherein said data signature is transmitted to the target using the file transfer protocol ("FTP") and said non-protocol response indicates a raw shell connection to said target.

22. A computer-implemented method comprising:

identifying a plurality of data signatures relevant to computer security;

designating a relative alert condition value to each data signature based on each data signature itself and contextual information associated with the data signature, each alert condition value comprising a ranked value that is unique to each combination of data signature and contextual information associated with a particular data signature, the contextual information comprising at least one of an application layer data field type used to encapsulate the data signature and an application layer protocol type used to transmit the data signature, the alert condition value indicating a security risk level relative to different data signatures and relative to other identical data signatures associated with different contextual information;

creating a table comprising the contextual information, the data signatures, and the relative alert condition values;

monitoring a plurality of data transmissions at an applications layer level between a suspect and a target to identify one or more data signatures, said data transmissions indicating a current state of communication between said suspect and said target;

evaluating contextual information related to each data signature by comparing the contextual information and data signatures to the table;

evaluating a likelihood that said target is under attack based on the contextual information of one or more data signatures of said transmissions and said current state of communication; and assigning a relative alert condition value to the data signature based on the comparison of the contextual information to data in the table.

23. The method as in claim 22 wherein said current state of communication is based on a known protocol with which said data transmissions are transmitted/received between said suspect and target.

24. The method as in claim 23 wherein said known protocol is FTP.

25. The method as in claim 24 wherein one of said data signatures is the filename "passwd" in a context in which filenames are likely to appear.

26. The method as in claim 23 wherein said known protocol is HTTP.

27. The method as in claim 23 wherein said known protocol is RPC.

28. The method as in claim 22 further comprising:

monitoring responses from said target following said data signature; and determining a likelihood of whether said target is under attack based on data signatures of said responses.

29. The method as in claim 22 wherein said current state comprises any outbound connection from said target is following a detected signature.

30. The method as in claim 22 wherein said current state comprises an inbound connection to a new port following a detected signature.

31. The method as in claim 22 monitoring said current state comprises:

profiling said target to determine which ports are open by passively listening to what traffic succeeds in talking to/from the target.

32. The method as in claim 22 monitoring said current state comprises:

detecting non-protocol requests or responses transmitted to/from said target.

33. The method as in claim 22 further comprising:

determining a fingerprint of said target; and further evaluating a likelihood that said target is under attack based on said fingerprint.

34. A machine-readable physical medium having program code stored thereon which, when executed by a machine, causes said machine to perform the operations of:

identifying a plurality of data signatures relevant to computer security;

designating a relative alert condition value to each data signature based on each data signature itself and contextual information associated with the data signature, each alert condition value comprising a ranked value that is unique to each combination of data signature and contextual information associated with a particular data signature, the contextual information comprising at least one of an application layer data field type used to encapsulate the data signature and an application layer protocol type used to transmit the data signature, the relative alert condition value indicating a security risk level relative to different data signatures and relative to other identical data signatures associated with different contextual information;

creating a table comprising the contextual information, the data signatures, and the relative alert condition values;

detecting a data signature by evaluating communications at an application layer level between a target and a suspect;

correlating said data signature with a fingerprint of the target to determine to what extent said target is vulnerable to said data signature; and evaluating contextual information related to the data signature by comparing the contextual information and the data signature to the table in order to determine a likelihood that said target is under attack; and assigning a relative alert condition value to the data signature based on the comparison of the contextual information and data signature to data in the table.

35. The machine-readable medium as in claim 34 further comprising program code to cause said machine to perform the operations of:

evaluating contextual information related to said data signature to determine a likelihood that said target is under attack.

36. The machine-readable medium as in claim 34 wherein said fingerprint includes said target node's operating system version.

37. The machine-readable medium as in claim 34 wherein said fingerprint includes said target node's processor type.

38. The machine-readable medium as in claim 34 further comprising program code to cause said machine to perform the operations of:

generating a first alert condition upon determining that said target node is vulnerable to said data signature.

39. The machine-readable medium as in claim 34 further comprising program code to cause said machine to perform the operations of:

listening for a response to said data signature from said target.

40. The machine-readable medium as in claim 39 further comprising program code to cause said machine to perform the operations of:

determining whether said target node's response or lack of a response is suspicious.

41. The machine-readable medium as in claim 40 wherein determining whether said target's response is suspicious comprises determining whether said target's response is an "unknown command" response.

42. The machine-readable medium as in claim 40 further comprising program code to cause said machine to perform the operations of:

generating a second alert condition upon determining that said target node's response or lack of a response is suspicious.

43. The machine-readable medium as in claim 42 further comprising program code to cause said machine to perform the operations of:

combining the second alert with the first, thereby updating the first alert with information within the second alert.

44. The machine-readable medium as in claim 43 wherein said target node's suspicious behavior comprises transmitting a root shell prompt to a suspect node.

45. The machine-readable medium as in claim 34 further comprising program code to cause said machine to perform the operations of:

listening for behavior of said target node; and generating a second alert condition upon determining that said target node's behavior is suspicious.

46. A machine-readable physical medium having program code stored thereon which, when executed by a machine, causes said machine to perform the operations of:

identifying a plurality of data signatures relevant to computer security;

designating an alert condition value to each data signature based on each data signature itself and contextual information associated with the data signature, each alert condition value comprising a ranked value that is unique to each combination of data signature and contextual information associated with a particular data signature, the contextual information comprising at least one of an application layer data field type used to encapsulate the data signature and an application layer protocol type used to transmit the data signature, the alert condition value indicating a security risk level relative to different data signatures and relative to other identical data signatures associated with different contextual information;

creating a table comprising the data signatures, the contextual information, and the alert condition values;

identifying a data signature encapsulated in an application layer data field directed at a target using an application layer protocol;

evaluating a context of the data signature by one of:

reviewing the application layer data field type;

reviewing the application layer protocol type; and comparing the evaluated context of the data signature to the table;

determining whether said data signature poses a threat based on said context of said data signature; and assigning an alert condition value to the data signature based on the comparison of the context to data in the table.

47. The machine-readable medium as in claim 46 wherein said protocol is the HyperText Transport Protocol ("HTTP").

48. The machine-readable medium as in claim 47 further comprising program code to cause said machine to perform the operations of:

determining that said data signature poses a threat if said data signature is "Icgi-bin/phf" embedded in the header of said HTTP data transmission.

49. The machine-readable medium as in claim 46 further comprising program code to cause said machine to perform the operations of:

further evaluating whether said data signature poses a threat based on a fingerprint of said target.

50. The machine-readable medium as in claim 49 wherein said fingerprint is comprised of a particular service executed on said target.

51. A machine-readable physical medium having program code stored thereon which, when executed by a machine, causes said machine to perform the operations of:

identifying a plurality of data signatures relevant to computer security;

designating a relative alert condition value to each data signature based on each data signature itself and contextual information associated with the data signature, each alert condition value comprising a ranked value that is unique to each combination of data signature and contextual information associated with a particular data signature, the contextual information comprising at least one of an application layer data field type used to encapsulate the data signature and an application layer protocol type used to transmit the data signature, the relative alert condition value indicating a security risk level relative to different data signatures and relative to other identical data signatures associated with different contextual information;

creating a table comprising the contextual information, the data signatures, and the relative alert condition values;

monitoring a plurality of data transmissions at an applications layer level between a suspect and a target to identify one or more data signatures, said data transmissions indicating a current state of communication between said suspect and said target;

evaluating contextual information related to each data signature by comparing the contextual information and data signatures to the table;

evaluating a likelihood that said target is under attack based on the contextual information of one or more data signatures of said transmissions and said current state of communication; and assigning a relative alert condition value to the data signature based on the comparison of the contextual information to data in the table.

52. The machine-readable medium as in claim 51 comprising program code to cause said machine to perform the additional operations of:

monitoring responses from said target following said data signature; and determining a likelihood of whether said target is under attack based on data signatures of said responses.

* * * * *